US012659747B2

(12) United States Patent
Hu et al.

(10) Patent No.: US 12,659,747 B2
(45) Date of Patent: Jun. 16, 2026

(54) COMMUNICATION METHOD AND COMMUNICATION APPARATUS

(71) Applicant: HUAWEI TECHNOLOGIES CO., LTD., Shenzhen (CN)

(72) Inventors: Li Hu, Shanghai (CN); Yang Xin, Shanghai (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 18/452,579

(22) Filed: Aug. 21, 2023

(65) Prior Publication Data

US 2023/0397008 A1     Dec. 7, 2023

Related U.S. Application Data

(63) Continuation of application No. PCT/CN2022/076670, filed on Feb. 17, 2022.

(30) Foreign Application Priority Data

Feb. 21, 2021    (CN) .......................... 202110194679.2

(51) Int. Cl.
  *H04W 12/10*        (2021.01)
  *H04W 36/00*        (2009.01)
  *H04W 36/14*        (2009.01)
(52) U.S. Cl.
  CPC ....... *H04W 12/10* (2013.01); *H04W 36/0038* (2013.01); *H04W 36/1443* (2023.05)
(58) Field of Classification Search
  None
  See application file for complete search history.

(56) References Cited

U.S. PATENT DOCUMENTS

2019/0191467 A1*  6/2019  Dao ...................... H04W 76/11
2019/0246282 A1*  8/2019  Li ...................... H04W 12/033

FOREIGN PATENT DOCUMENTS

CA       3109203 A1    2/2020
WO    2020177501 A1    9/2020

OTHER PUBLICATIONS

3GPP, 3rd Generation Partnership Project; Technical Specification Group Services and System Aspects; Key issues and potential solutions for integrity protection of the user plane; (Release 16), 3GPP TR 33.853 V1.4.0 [online], Feb. 8, 2021, total 62 pages.

(Continued)

*Primary Examiner* — Frantz Bataille

(57)    ABSTRACT

This application provides a communication method and a communication apparatus. The method includes: A session management network element obtains first indication information in a session establishment process of a session in a first network for a terminal device, where the first indication information indicates that user plane integrity protection in a second network is supported. The session management network element sends a first request message to an access and mobility management function network element in the first network based on the first indication information, where the first request message is used to request to assign a bearer identifier of the second network for the session. The session management network element receives a first response message from the access and mobility management function network element, where the first response message includes the bearer identifier.

21 Claims, 9 Drawing Sheets

(56)             References Cited

OTHER PUBLICATIONS

3rd Generation Partnership Project; Technical Specification Group Services and System Aspects; System architecture for the 5G System (5GS); Stage 2(Release 15), 3GPP TS 23.501 V15.12.0 (Dec. 2020), total:250pages.
3rd Generation Partnership Project; Technical Specification Group Services and System Aspects; Procedures for the 5G System (5GS); Stage 2(Release 16),3GPP TS 23.502 V16.7.1 (Jan. 2021), total:603page.

* cited by examiner

600

700

700

COMMUNICATION METHOD AND COMMUNICATION APPARATUS

CROSS-REFERENCE TO RELATED APPLICATIONS

This application is a continuation of International Application No. PCT/CN2022/076670, filed on Feb. 17, 2022, which claims priority to Chinese Patent Application No. 202110194679.2, filed on Feb. 21, 2021. The disclosures of the aforementioned applications are hereby incorporated by reference in their entireties.

TECHNICAL FIELD

This application relates to the communication field, and more specifically, to a communication method and a communication apparatus.

BACKGROUND

An on-demand user plane security protection mechanism is a security mechanism in a 5th generation (5th Generation, 5G) network, and on-demand user plane security protection includes user plane encryption protection and user plane integrity protection. In the on-demand user plane security protection mechanism, an access network device in the 5G network needs to determine, according to a user plane security policy received from a core network device, whether to activate user plane encryption protection and/or user plane integrity protection between the access network device and user equipment (user equipment, UE). The on-demand user plane security protection mechanism can provide more flexible user plane security protection for the UE.

However, an existing 4th generation (4th Generation, 4G) network does not support the on-demand user plane security protection mechanism. In the 4G network, user plane security between an access network device in the 4G network and the UE is fixed. To be specific, that user plane security is fixed means that user plane encryption protection is activated, and user plane integrity protection is not activated.

The 4G network will not retire in a short term. In this case, how to apply the on-demand user plane security protection mechanism to the 4G network has become a research hotspot in the industry.

Once the on-demand user plane security protection mechanism is introduced to the 4G network, how to implement interworking between the 4G network and the 5G network is a problem that needs to be urgently resolved in a current standard.

SUMMARY

This application provides a communication method, to remove a limitation that a session established for a terminal device in a first network cannot be handed over to a second network when a user plane security policy in the first network requires that user plane integrity protection be activated.

According to a first aspect, a communication method is provided. The method may include: A session management network element obtains first indication information in a process of session establishment in a first network for a terminal device, where the first indication information indicates that user plane integrity protection in a second network is supported. The session management network element sends a first request message to an access and mobility management function network element in the first network based on the first indication information, where the first request message is used to request to assign a bearer identifier to the session, and the bearer identifier corresponds to a bearer context of the terminal device in the second network. The session management network element receives a first response message from the access and mobility management function network element, where the first response message includes the bearer identifier.

According to the foregoing technical solution, the session management network element can remove, based on the first indication information, a limitation that the session established for the terminal device in the first network cannot be handed over to the second network when a user plane security policy in the first network requires that user plane integrity protection be activated. According to the existing solution, when the user plane security policy in the first network requires that user plane integrity protection be activated, the session management network element does not request the bearer identifier from the access and mobility management function network element. Therefore, the access and mobility management function network element does not locally store the corresponding bearer identifier. In this case, when subsequently receiving a handing over requirement from an access network device in the first network, the access and mobility management function network element does not perform a related procedure of handing over the session established for the terminal device in the first network to the second network.

In a possible implementation, the session management network element sends the first request message to the access and mobility management function network element based on the first indication information without considering the user plane security policy in the first network.

That the session management network element does not consider the user plane security policy in the first network may be understood as that the session management network element does not consider a value of the user plane security policy in the first network. In other words, regardless of the value of the user plane security policy in the first network, the session management network element may send the first request message to the access and mobility management function network element based on the first indication information. For example, the session management network element may send the first request message to the access and mobility management function network element based on the first indication information when the user plane security policy in the first network includes activating user plane integrity protection (in other words, the value of user plane integrity protection is required (required)).

It should be understood that, when the terminal device is not connected in the 3rd generation partnership project, and the session that is requested to be established for the terminal device does not support interworking with the second network based on an N26 interface, the session management network element does not send the first request message to the access and mobility management function network element. Therefore, that the session management network element sends the first request message to the access and mobility management function network element based on the first indication information without considering the user plane security policy in the first network may be understood as that when the terminal device is connected in the 3rd generation partnership project, and the session that is requested to be established for the terminal device supports interworking with the second network based on an N26 interface, the session management network element sends the first request message to the access and mobility management function network element based on the first indication information without considering the user plane security policy in the first network.

For example, the first network is a 5th generation (5th generation, 5G) network, the second network is a 4th generation (4th generation, 5G) network, the session of the terminal device in the first network is a protocol data unit (protocol data unit, PDU) session, and the bearer context is an evolved packet system bearer context (evolved packet system bearer context, EPS bearer context).

For example, in a process of session establishment in a first network for a terminal device includes: after the terminal device sends a PDU session establishment request message and before the terminal device receives a PDU session establishment accept message.

With reference to the first aspect, in some implementations of the first aspect, the method further includes: The session management network element maps a user plane security policy of the terminal device in the first network to a user plane security policy of the terminal device in the second network. The session management network element stores the user plane security policy in the second network in the bearer context.

Based on the foregoing technical solution, the session management network element may map the user plane security policy of the terminal device in the first network to the user plane security policy of the terminal device in the second network, and may store the user plane security policy of the terminal device in the second network in the bearer context. Further, in a process in which the terminal device is handed over from the first network to the second network, the access and mobility management function network element in the first network obtains the bearer context from the session management network element, and further sends the obtained bearer context to a mobility management entity in the second network, so that the terminal device is handed over from the first network to the second network.

For example, the user plane security policy of the terminal device in the first network includes a user plane encryption protection policy and/or a user plane integrity protection policy, and the user plane security policy of the terminal device in the second network includes a user plane encryption protection policy and/or a user plane integrity protection policy.

For example, the user plane security policy in the first network is locally stored by the session management network element, or the user plane security policy in the first network is obtained by the session management network element from a unified data management network element.

For example, the user plane security policy of the terminal device in the first network is at a granularity of a PDU session, and the user plane security policy of the terminal device in the first network is at a granularity of an evolved packet system bearer (evolved packet system bearer, EPS bearer).

The user plane security policy of the terminal device in the first network may alternatively be at a granularity of a data network name (data network name, DNN)+single network slice selection assistance information (single network slice selection assistance information, S-NSSAI).

The user plane security policy of the terminal device in the second network may alternatively be at a granularity of an evolved universal terrestrial radio access network radio access bearer (evolved universal terrestrial radio access network radio access bearer, E-RAB) or an access point name (access point name, APN).

With reference to the first aspect, in some implementations of the first aspect, the method further includes: The session management network element obtains third indication information, where the third indication information indicates to perform user plane security policy mapping. That the session management network element maps a user plane security policy of the terminal device in the first network to a user plane security policy of the terminal device in the second network includes: The session management network element maps the user plane security policy of the terminal device in the first network to the user plane security policy of the terminal device in the second network based on the third indication information.

Based on the foregoing technical solution, when receiving the third indication information, the session management network element maps the user plane security policy of the terminal device in the first network to the user plane security policy of the terminal device in the second network, so that the session management network element can be prevented from performing unnecessary mapping, and processing logic of the session management network element is optimized. When the session management network element does not receive the third indication information, the session management network element directly maps the user plane security policy of the terminal device in the first network to the user plane security policy of the terminal device in the second network. If the second network does not support the activation of user plane integrity protection, the terminal device cannot be handed over from the first network to the second network, and mapping performed by the session management network element is unnecessary mapping.

With reference to the first aspect, in some implementations of the first aspect, the method further includes: The session management network element sends the bearer context to a target mobility management entity in the second network via the access and mobility management function network element, where the target mobility management entity is a network element that serves the terminal device when the session is handed over to the second network.

Based on the foregoing technical solution, the session management network element sends the user plane security policy of the terminal device in the second network to the target mobility management entity, so that in the process in which the terminal device is handed over from the first network to the second network, the target mobility management entity may determine a user plane security activation state of the terminal device in the second network according to the user plane security policy of the terminal device in the second network. This helps the terminal device be successfully handed over from the first network to the second network.

With reference to the first aspect, in some implementations of the first aspect, the method further includes: The session management network element sends a fully qualified domain name of the session management network element on an S5/S8 interface to a unified data management network element based on the first indication information without considering the user plane security policy of the terminal device in the first network.

Based on the foregoing technical solution, the session management network element sends the fully qualified domain name of the session management network element on the S5/S8 interface to the unified data management network element based on the first indication information, so as to remove a limitation that the session established for the terminal device in the first network cannot be handed over to the second network when the user plane security policy in the first network requires that user plane integrity protection be activated. According to the existing solution, when the user plane security policy in the first network requires that user plane integrity protection be activated, the session management network element does not send the fully qualified domain name of the session management network element on the S5/S8 interface to the unified data management network element. Therefore, the session established for the terminal device in the first network cannot be subsequently handed over to the second network.

That the session management network element does not consider the user plane security policy in the first network may be understood as that the session management network element does not consider a value of the user plane security policy in the first network. In other words, regardless of the value of the user plane security policy in the first network, the session management network element may send the fully qualified domain name on the S5/S8 interface to the unified data management network element based on the first indication information. For example, the session management network element may send the fully qualified domain name on the S5/S8 interface to the unified data management network element based on the first indication information when the user plane security policy in the first network includes activating user plane integrity protection (in other words, the value of user plane integrity protection is required (required)).

It should be understood that, when the terminal device does not support interworking with the second network and/or the session of the terminal device in the first network does not support interworking with the second network, the session management network element does not send the fully qualified domain name on the S5/S8 interface to the unified data management network element. Therefore, that the session management network element sends a fully qualified domain name on an S5/S8 interface to a unified data management network element based on the first indication information without considering the user plane security policy in the first network may be understood as that when the terminal device supports the interworking with the second network and the session of the terminal device in the first network supports the interworking with the second network, the session management network element sends the fully qualified domain name on the S5/S8 interface to the unified data management network element based on the first indication information without considering the user plane security policy in the first network.

With reference to the first aspect, in some implementations of the first aspect, that a session management network element obtains first indication information includes: The session management network element receives the first indication information from the access and mobility management function network element.

For example, the first indication information is included in a protocol data unit session session management context establishment request message.

With reference to the first aspect, in some implementations of the first aspect, that a session management network element obtains first indication information includes: The session management network element receives the first indication information from the terminal device via the access and mobility management function network element.

For example, the first indication information is included in a protocol data unit session establishment request message.

According to a second aspect, a communication method is provided. The method may include: An access and mobility management function network element in a first network receives a registration request message from a terminal device, where the registration request message includes second indication information, and the second indication information indicates that the terminal device supports user plane integrity protection in a second network. In a process of session establishment in the first network for the terminal device, the access and mobility management function network element sends first indication information to a session management network element based on the second indication information, where the first indication information indicates that support user plane integrity protection in the second network is supported. The access and mobility management function network element receives a first request message, where the first request message is used to request to assign a bearer identifier to the session, and the bearer identifier corresponds to a bearer context of the terminal device in the second network. The access and mobility management function network element sends a first response message to the session management network element, where the first response message includes the bearer identifier.

Based on the foregoing technical solution, the access and mobility management function network element sends the first indication information to the session management network element, so that the session management network element can remove, based on the first indication information, a limitation that the session established for the terminal device in the first network cannot be handed over to the second network when a user plane security policy in the first network requires that user plane integrity protection be activated. According to the existing solution, when the user plane security policy in the first network requires that user plane integrity protection be activated, the session management network element does not request the bearer identifier from the access and mobility management function network element. Therefore, the access and mobility management function network element does not locally store the corresponding bearer identifier. In this case, when subsequently receiving a handing over requirement from an access network device in the first network, the access and mobility management function network element does not perform a related procedure of handing over the session established for the terminal device in the first network to the second network.

For example, the first network is a 5th generation network, the second network is a 4th generation network, the session of the terminal device in the first network is a protocol data unit session, and the bearer context is an evolved packet system bearer context.

For example, in a process of session establishment in a first network for a terminal device includes: after the terminal device sends a PDU session establishment request message and before the terminal device receives a PDU session establishment accept message.

With reference to the second aspect, in some implementations of the second aspect, the method further includes: The access and mobility management function network element sends a second request message to the session management function network element. The access and mobility management function network element receives a second response message from the session management network element, where the second response message includes the bearer context, the bearer context includes a user plane security policy of the terminal device in the second network, and the user plane security policy in the second network is obtained according to a user plane security policy of the terminal device in the first network. The access and mobility management function network element sends the bearer context to a target mobility management entity in the second network, where the target mobility management entity is a network element that serves the terminal device when the session is handed over to the second network.

Based on the foregoing technical solution, the access and mobility management function network element may obtain the user plane security policy of the terminal device in the second network from the session management network element, and send the user plane security policy of the terminal device in the second network to the target mobility management entity, so that a problem of how the access and mobility management function network element obtains the user plane security policy of the terminal device in the second network in a process of handing over the terminal device from the first network to the second network is resolved. This helps the terminal device be successfully handed over from the first network to the second network.

For example, the user plane security policy of the terminal device in the first network includes a user plane encryption protection policy and/or a user plane integrity protection policy, and the user plane security policy of the terminal device in the second network includes a user plane encryption protection policy and/or a user plane integrity protection policy.

For example, a granularity of the user plane security policy in the first network is a granularity of a protocol data unit session. A granularity of the user plane security policy in the second network is a granularity of an evolved packet system bearer.

The user plane security policy of the terminal device in the first network may alternatively be a data network name+ single network slice selection assistance information granularity.

The user plane security policy of the terminal device in the second network may alternatively be at a granularity of an evolved universal terrestrial radio access network radio access bearer or an access point name.

For example, the second request message is a protocol data unit session context request message, and the second response message is a protocol data unit session context response message.

With reference to the second aspect, in implementations of the second aspect, the second request message includes third indication information, and the third indication information indicates to perform user plane security policy mapping; and the method further includes: The access and mobility management function network element determines, according to a second local policy, to add the third indication information to the second request message, where the second local policy includes one or more of the following: whether the session supports interworking with the second network, and whether the target mobility management entity supports user plane integrity protection, where the target mobility management entity is a network element that serves the terminal device when the session is handed over to the second network.

Based on the foregoing technical solution, the access and mobility management function network element sends the third indication information to the session management network element, so that when receiving the third indication information, the session management network element maps the user plane security policy of the terminal device in the first network to the user plane security policy of the terminal device in the second network. This can prevent the session management network element from performing unnecessary mapping, and optimize processing logic of the session management network element. When the session management network element does not receive the third indication information, the session management network element directly maps the user plane security policy of the terminal device in the first network to the user plane security policy of the terminal device in the second network. If the second network does not support the activation of user plane integrity protection, the terminal device cannot be handed over from the first network to the second network, and mapping performed by the session management network element is unnecessary mapping.

With reference to the second aspect, in implementations of the second aspect, the method further includes: The access and mobility management function network element determines, according to a first local policy, to send the first indication information to the session management network element, where the first local policy includes: whether the session supports interworking with the second network.

According to a third aspect, a communication method is provided. The method may include: A terminal device sends second indication information to an access and mobility management function network element in a first network, where the second indication information indicates that the terminal device supports user plane integrity protection in a second network. The terminal device receives radio resource control reconfiguration sent by an access network device in the second network, where the radio resource control reconfiguration includes indication information for activating user plane integrity protection.

Based on the foregoing technical solution, the terminal device sends the second indication information to the access and mobility management function network element in the first network, so that the terminal device can be successfully handed over from the first network to the second network.

For example, the second indication information is included in a registration request message.

For example, the second indication information is included in a protocol data unit session establishment request message.

According to a fourth aspect, a communication method is provided. The method may include: A session management network element receives a second request message from an access and mobility management function network element in a first network. The session management network element sends a second response message to the access and mobility management function network element in response to the second request message, where the second response message includes a bearer context, the bearer context includes a user plane security policy of a terminal device in a second network, and the user plane security policy in the second network is obtained according to a user plane security policy of the terminal device in the first network.

Based on the foregoing technical solution, the session management network element sends the user plane security policy of the terminal device in the second network to the access and mobility management function network element, so that a problem of how the access and mobility management function network element obtains the user plane security policy of the terminal device in the second network in a process of handing over the terminal device from the first network to the second network is resolved. This helps the terminal device be successfully handed over from the first network to the second network.

For example, in the process in which the terminal device is handed over from the first network to the second network, the session management network element receives the second request message from the access and mobility management function network element in the first network, and sends the second response message to the access and mobility management function network element in response to the second request message.

For example, the first network is a 5th generation network, the second network is a 4th generation network, and the bearer context is an evolved packet system bearer context.

For example, the user plane security policy of the terminal device in the first network includes a user plane encryption protection policy and/or a user plane integrity protection policy, and the user plane security policy of the terminal device in the second network includes a user plane encryption protection policy and/or a user plane integrity protection policy.

For example, the user plane security policy of the terminal device in the first network is a granularity of a protocol data unit session, and the user plane security policy of the terminal device in the first network is a granularity of an evolved packet system bearer.

The user plane security policy of the terminal device in the first network may alternatively be a data network name+single network slice selection assistance information granularity.

The user plane security policy of the terminal device in the second network may alternatively be at a granularity of an evolved universal terrestrial radio access network radio access bearer or an access point name.

For example, the second request message is a protocol data unit session context request message, and the second response message is a protocol data unit session context response message.

With reference to the fourth aspect, in some implementations of the fourth aspect, the method further includes: The session management network element maps the user plane security policy in the first network to the user plane security policy in the second network. The session management network element stores the user plane security policy in the second network in the bearer context.

Based on the foregoing technical solution, the session management network element may map the user plane security policy of the terminal device in the first network to the user plane security policy of the terminal device in the second network, and may store the user plane security policy of the terminal device in the second network in the bearer context. Further, in a process in which the terminal device is handed over from the first network to the second network, the access and mobility management function network element in the first network obtains the bearer context from the session management network element, and further sends the obtained bearer context to a mobility management entity in the second network, so that the terminal device is handed over from the first network to the second network.

With reference to the fourth aspect, in some implementations of the fourth aspect, the method further includes: The session management network element obtains first indication information, where the first indication information indicates that support user plane integrity protection in the second network is supported. That the session management network element maps the user plane security policy in the first network to the user plane security policy in the second network includes: When receiving the first indication information, the session management network element maps the user plane security policy in the first network to the user plane security policy in the second network.

Based on the foregoing technical solution, when receiving the first indication information, the session management network element may directly map the user plane security policy of the terminal device in the first network to the user plane security policy of the terminal device in the second network without considering the user plane security policy in the first network, so that processing logic of the session management network element is optimized. If the session management network element does not receive the first indication information, before performing mapping, optionally, the session management network element needs to first determine whether the user plane security policy in the first network requires activating of user plane integrity protection, and if user plane integrity protection is not required to be activated, maps the user plane security policy of the terminal device in the first network to the user plane security policy of the terminal device in the second network.

For example, the user plane security policy in the first network is locally stored by the session management network element, or the user plane security policy in the first network is obtained by the session management network element from a unified data management network element.

With reference to the fourth aspect, in some implementations of the fourth aspect, the method further includes: The session management network element obtains first indication information, where the first indication information indicates that support user plane integrity protection in the second network is supported. The session management network element requests the bearer identifier from the access and mobility management function network element based on the first indication information, where the bearer identifier corresponds to the bearer context.

For example, the session management network element obtains the first indication information in a process of session establishment in the first network for the terminal device. For example, in a process of session establishment in a first network for a terminal device includes: after the terminal device sends a PDU session establishment request message and before the terminal device receives a PDU session establishment accept message.

In a possible implementation, the session management network element sends the first request message to the access and mobility management function network element based on the first indication information without considering the user plane security policy in the first network.

That the session management network element does not consider the user plane security policy in the first network may be understood as that the session management network element does not consider a value of the user plane security policy in the first network. In other words, regardless of the value of the user plane security policy in the first network, the session management network element may send the first request message to the access and mobility management function network element based on the first indication information. For example, the session management network element may send the first request message to the access and mobility management function network element based on the first indication information when the user plane security policy in the first network includes activating user plane integrity protection (in other words, the value of user plane integrity protection is required (required)).

It should be understood that, when the terminal device is not connected in the 3rd generation partnership project, and the session that is requested to be established for the terminal device does not support interworking with the second network based on an N26 interface, the session management network element does not send the first request message to the access and mobility management function network element. Therefore, that the session management network element sends the first request message to the access and mobility management function network element based on the first indication information without considering the user plane security policy in the first network may be understood as that when the terminal device is connected in the 3rd generation partnership project, and the session that is requested to be established for the terminal device supports interworking with the second network based on an N26 interface, the session management network element sends the first request message to the access and mobility management function network element based on the first indication information without considering the user plane security policy in the first network.

According to the foregoing technical solution, the session management network element can remove, based on the first indication information, a limitation that the session established for the terminal device in the first network cannot be handed over to the second network when a user plane security policy in the first network requires that user plane integrity protection be activated. According to the existing solution, when the user plane security policy in the first network requires that user plane integrity protection be activated, the session management network element does not request the bearer identifier from the access and mobility management function network element. Therefore, the access and mobility management function network element does not locally store the corresponding bearer identifier. In this case, when subsequently receiving a handing over requirement from an access network device in the first network, the access and mobility management function network element does not perform a related procedure of handing over the session established for the terminal device in the first network to the second network.

With reference to the fourth aspect, in some implementations of the fourth aspect, the method further includes: The session management network element sends a fully qualified domain name of the session management network element on an S5/S8 interface to a unified data management network element based on the first indication information without considering the user plane security policy of the terminal device in the first network.

Based on the foregoing technical solution, the session management network element sends the fully qualified domain name of the session management network element on the S5/S8 interface to the unified data management network element based on the first indication information, so as to remove a limitation that the session established for the terminal device in the first network cannot be handed over to the second network when the user plane security policy in the first network requires that user plane integrity protection be activated. According to the existing solution, when the user plane security policy in the first network requires that user plane integrity protection be activated, the session management network element does not send the fully qualified domain name of the session management network element on the S5/S8 interface to the unified data management network element. Therefore, the session established for the terminal device in the first network cannot be subsequently handed over to the second network.

That the session management network element does not consider the user plane security policy in the first network may be understood as that the session management network element does not consider a value of the user plane security policy in the first network. In other words, regardless of the value of the user plane security policy in the first network, the session management network element may send the fully qualified domain name on the S5/S8 interface to the unified data management network element based on the first indication information. For example, the session management network element may send the fully qualified domain name on the S5/S8 interface to the unified data management network element based on the first indication information when the user plane security policy in the first network includes activating user plane integrity protection (in other words, the value of user plane integrity protection is required (required)).

It should be understood that, when the terminal device does not support interworking with the second network and/or the session of the terminal device in the first network does not support interworking with the second network, the session management network element does not send the fully qualified domain name on the S5/S8 interface to the unified data management network element. Therefore, that the session management network element sends a fully qualified domain name on an S5/S8 interface to a unified data management network element based on the first indication information without considering the user plane security policy in the first network may be understood as that when the terminal device supports the interworking with the second network and the session of the terminal device in the first network supports the interworking with the second network, the session management network element sends the fully qualified domain name on the S5/S8 interface to the unified data management network element based on the first indication information without considering the user plane security policy in the first network.

With reference to the fourth aspect, in some implementations of the fourth aspect, that a session management network element obtains first indication information includes: The session management network element receives the first indication information from the access and mobility management function network element.

For example, the first indication information is included in a protocol data unit session session management context establishment request message.

With reference to the fourth aspect, in some implementations of the fourth aspect, that a session management network element obtains first indication information includes: The session management network element receives the first indication information from the terminal device via the access and mobility management function network element.

For example, the first indication information is included in a protocol data unit session establishment request message.

According to a fifth aspect, a communication method is provided. The method may include: An access and mobility management function network element in a first network sends a second request message to a session management network element. The access and mobility management function network element receives a second response message from the session management network element, where the second response message includes a bearer context, the bearer context includes a user plane security policy of a terminal device in a second network, and the user plane security policy in the second network is obtained according to a user plane security policy of the terminal device in the first network. The access and mobility management function network element sends the bearer context to a target mobility management entity serving the terminal device in the second network.

Based on the foregoing technical solution, the access and mobility management function network element may obtain the user plane security policy of the terminal device in the second network from the session management network element, and send the user plane security policy of the terminal device in the second network to the target mobility management entity, so that a problem of how the access and mobility management function network element obtains the user plane security policy of the terminal device in the second network in a process of handing over the terminal device from the first network to the second network is resolved. This helps the terminal device be successfully handed over from the first network to the second network.

For example, the user plane security policy of the terminal device in the first network includes a user plane encryption protection policy and/or a user plane integrity protection policy, and the user plane security policy of the terminal device in the second network includes a user plane encryption protection policy and/or a user plane integrity protection policy.

For example, a granularity of the user plane security policy in the first network is a granularity of a protocol data unit session. A granularity of the user plane security policy in the second network is a granularity of an evolved packet system bearer.

The user plane security policy of the terminal device in the first network may alternatively be a data network name+ single network slice selection assistance information granularity.

The user plane security policy of the terminal device in the second network may alternatively be at a granularity of an evolved universal terrestrial radio access network radio access bearer or an access point name.

For example, the second request message is a protocol data unit session context request message, and the second response message is a protocol data unit session context response message.

With reference to the fifth aspect, in some implementations of the fifth aspect, the method further includes: The access and mobility management function network element receives second indication information from the terminal device, where the second indication information indicates that the terminal device supports user plane integrity protection in the second network. The access and mobility management function network element sends first indication information to the session management network element based on the second indication information, where the first indication information indicates that support user plane integrity protection in the second network is supported.

For example, the second indication information is included in a registration request message, and the first indication information is included in a protocol data unit session session management context establishment request message.

With reference to the fifth aspect, in some implementations of the fifth aspect, the method further includes: The access and mobility management function network element determines, according to a first local policy, whether to send the first indication information to the session management network element, where the first local policy includes whether a session of the terminal device in the first network supports interworking with the second network.

According to a sixth aspect, a communication apparatus is provided, including units configured to perform steps in the method according to any one of the first aspect or the implementations of the first aspect.

According to a seventh aspect, a communication apparatus is provided, including units configured to perform steps in the method according to any one of the second aspect or the implementations of the second aspect.

According to an eighth aspect, a communication apparatus is provided, including units configured to perform steps in the method according to any one of the third aspect or the implementations of the third aspect.

According to a ninth aspect, a communication apparatus is provided. The communication apparatus may include a transceiver unit, and the transceiver unit is configured to receive a second request message from an access and mobility management function network element in a first network. The transceiver unit is further configured to send a second response message to the access and mobility management function network element in response to the second request message, where the second response message includes a bearer context, the bearer context includes a user plane security policy of a terminal device in a second network, and the user plane security policy in the second network is obtained according to a user plane security policy of the terminal device in the first network.

For example, in the process in which the terminal device is handed over from the first network to the second network, the transceiver unit is configured to: receive the second request message from the access and mobility management function network element in the first network, and send the second response message to the access and mobility management function network element in response to the second request message.

For example, the first network is a 5th generation network, the second network is a 4th generation network, and the bearer context is an evolved packet system bearer context.

For example, the user plane security policy of the terminal device in the first network includes a user plane encryption protection policy and/or a user plane integrity protection policy, and the user plane security policy of the terminal device in the second network includes a user plane encryption protection policy and/or a user plane integrity protection policy.

For example, the user plane security policy of the terminal device in the first network is a granularity of a protocol data unit session, and the user plane security policy of the terminal device in the first network is a granularity of an evolved packet system bearer.

The user plane security policy of the terminal device in the first network may alternatively be a data network name+ single network slice selection assistance information granularity.

The user plane security policy of the terminal device in the second network may alternatively be at a granularity of an evolved universal terrestrial radio access network radio access bearer or an access point name.

For example, the second request message is a protocol data unit session context request message, and the second response message is a protocol data unit session context response message.

With reference to the ninth aspect, in some implementations of the ninth aspect, the communication apparatus further includes a processing unit, and the processing unit is configured to map the user plane security policy in the first network to the user plane security policy in the second network. The processing unit is further configured to store the user plane security policy in the second network in the bearer context.

With reference to the ninth aspect, in some implementations of the ninth aspect, the transceiver unit is further configured to obtain first indication information, where the first indication information indicates that support user plane integrity protection in the second network is supported. The processing unit is configured to, when receiving the first indication information, map the user plane security policy in the first network to the user plane security policy in the second network.

For example, the user plane security policy in the first network is locally stored by the session management network element, or the user plane security policy in the first network is obtained by the session management network element from a unified data management network element.

With reference to the ninth aspect, in some implementations of the ninth aspect, the transceiver unit is further configured to obtain first indication information, where the first indication information indicates that support user plane integrity protection in the second network is supported. The transceiver unit is further configured to request the bearer identifier from the access and mobility management function network element based on the first indication information, where the bearer identifier corresponds to the bearer context.

For example, the transceiver unit is configured to obtain the first indication information in a process of session establishment in the first network for the terminal device. For example, in a process of session establishment in a first network for a terminal device includes: after the terminal device sends a PDU session establishment request message and before the terminal device receives a PDU session establishment accept message.

In a possible implementation, the transceiver unit is configured to send a first request message to the access and mobility management function network element based on the first indication information without considering the user plane security policy in the first network.

With reference to the ninth aspect, in some implementations of the ninth aspect, the transceiver unit is further configured to send a fully qualified domain name of the session management network element on an S5/S8 interface to a unified data management network element based on the first indication information without considering the user plane security policy of the terminal device in the first network.

With reference to the ninth aspect, in some implementations of the ninth aspect, that a session management network element obtains first indication information includes: The session management network element receives the first indication information from the access and mobility management function network element.

For example, the first indication information is included in a protocol data unit session session management context establishment request message.

With reference to the ninth aspect, in some implementations of the ninth aspect, that a session management network element obtains first indication information includes: The session management network element receives the first indication information from the terminal device via the access and mobility management function network element.

For example, the first indication information is included in a protocol data unit session establishment request message.

According to a tenth aspect, a communication apparatus is provided. The communication apparatus may include a transceiver unit, and the transceiver unit is configured to send a second request message to a session management network element. The transceiver unit is further configured to receive a second response message from the session management network element, where the second response message includes a bearer context, the bearer context includes a user plane security policy of a terminal device in a second network, and the user plane security policy in the second network is obtained according to a user plane security policy of the terminal device in the first network. The transceiver unit is further configured to send the bearer context to a target mobility management entity serving the terminal device in the second network.

For example, the user plane security policy of the terminal device in the first network includes a user plane encryption protection policy and/or a user plane integrity protection policy, and the user plane security policy of the terminal device in the second network includes a user plane encryption protection policy and/or a user plane integrity protection policy.

For example, a granularity of the user plane security policy in the first network is a granularity of a protocol data unit session. A granularity of the user plane security policy in the second network is a granularity of an evolved packet system bearer.

The user plane security policy of the terminal device in the first network may alternatively be a data network name+ single network slice selection assistance information granularity.

The user plane security policy of the terminal device in the second network may alternatively be at a granularity of an evolved universal terrestrial radio access network radio access bearer or an access point name.

For example, the second request message is a protocol data unit session context request message, and the second response message is a protocol data unit session context response message.

With reference to the tenth aspect, in some implementations of the tenth aspect, the transceiver unit is further configured to receive second indication information from the terminal device, where the second indication information indicates that the terminal device supports user plane integrity protection in the second network. The transceiver unit is further configured to send first indication information to the session management network element based on the second indication information, where the first indication information indicates that support user plane integrity protection in the second network is supported.

For example, the second indication information is included in a registration request message, and the first indication information is included in a protocol data unit session session management context establishment request message.

With reference to the tenth aspect, in some implementations of the tenth aspect, the communication apparatus further includes a processing unit, and the processing unit is configured to determine, according to a first local policy, whether to send the first indication information to the session management network element, where the first local policy includes whether a session of the terminal device in the first network supports interworking with the second network.

According to an eleventh aspect, this application provides a communication device, including a processor. The processor is coupled to a memory, and may be configured to execute instructions in the memory, to implement the method in any one of the first aspect or the possible implementations of the first aspect, or implement the method in any one of the fourth aspect or the possible implementations of the fourth aspect. The communication device further includes the memory. The communication device further includes a communication interface. The processor is coupled to the communication interface.

In an implementation, the communication device is a session management network element. When the communication device is the session management network element, the communication interface may be a transceiver or an input/output interface.

In another implementation, the communication device is a chip or a chip system configured in a session management network element. When the communication device is the chip or the chip system configured in the session management network element, the communication interface may be an input/output interface.

The transceiver may be a transceiver circuit. The input/output interface may be an input/output circuit.

According to a twelfth aspect, this application provides a communication device, including a processor. The processor is coupled to a memory, and may be configured to execute instructions in the memory, to implement the method in any one of the second aspect or the possible implementations of the second aspect, or implement the method in any one of the fifth aspect or the possible implementations of the fifth aspect. The communication device further includes the memory. The communication device further includes a communication interface. The processor is coupled to the communication interface.

In an implementation, the communication device is an access and mobility management function network element. When the communication device is the access and mobility management function network element, the communication interface may be a transceiver or an input/output interface.

In another implementation, the communication device is a chip or a chip system configured in an access and mobility management function network element. When the communication device is the chip or the chip system configured in the access and mobility management function network element, the communication interface may be an input/output interface.

The transceiver may be a transceiver circuit. The input/output interface may be an input/output circuit.

According to a thirteenth aspect, this application provides a communication device, including a processor. The processor is coupled to a memory, and may be configured to execute instructions in the memory, to implement the method in any one of the third aspect and the possible implementations of the third aspect. The communication device further includes the memory. The communication device further includes a communication interface. The processor is coupled to the communication interface.

In an implementation, the communication device is a terminal device. When the communication device is the terminal device, the communication interface may be a transceiver or an input/output interface.

In another implementation, the communication device is a chip or a chip system configured in a terminal device. When the communication device is the chip or the chip system configured in the terminal device, the communication interface may be an input/output interface.

The transceiver may be a transceiver circuit. The input/output interface may be an input/output circuit.

According to a fourteenth aspect, this application provides a processor, including: an input circuit, an output circuit, and a processing circuit. The processing circuit is configured to: receive a signal through the input circuit, and transmit a signal through the output circuit, so that the processor performs the methods in the foregoing aspects.

During specific implementation, the processor may be a chip, the input circuit may be an input pin, the output circuit may be an output pin, and the processing circuit may be a transistor, a gate circuit, a trigger, any logic circuit, or the like. An input signal received by the input circuit may be received and input by using, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a fifteenth aspect, this application provides a processing apparatus, including: a communication interface and a processor. The communication interface is coupled to the processor. The communication interface is configured to input and/or output information. The information includes at least one of instructions or data. The processor is configured to execute a computer program, so that the processing apparatus performs the methods in the foregoing aspects.

According to a sixteenth aspect, this application provides a processing apparatus, including: a processor and a memory. The processor is configured to: read instructions stored in the memory, receive a signal by using a receiver, and transmit a signal by using a transmitter, so that the processing apparatus performs the methods in the foregoing aspects.

Optionally, there are one or more processors. If there is a memory, there may alternatively be one or more memories.

Optionally, the memory may be integrated with the processor, or the memory and the processor are separately disposed.

During specific implementation, the memory may be a non-transitory (non-transitory) memory, such as a read-only memory (read-only memory, ROM). The memory and the processor may be integrated into one chip, or may be separately disposed in different chips. A type of the memory and a manner of disposing the memory and the processor are not limited in this embodiment of this application.

It should be understood that in a related information exchange process, for example, sending indication information may be a process of outputting the indication information from the processor, and receiving the indication information may be a process of inputting the received indication information to the processor. Specifically, the information output by the processor may be output to the transmitter, and the input information received by the processor may be from the receiver. The transmitter and the receiver may be collectively referred to as a transceiver.

The apparatus in the fifteenth aspect and the sixteenth aspect may be a chip, the processor may be implemented by hardware, or may be implemented by software. When the processor is implemented by hardware, the processor may be a logic circuit, an integrated circuit, or the like. When the processor is implemented by the software, the processor may be a general-purpose processor, and is implemented by reading software code stored in a memory. The memory may be integrated into the processor, or may be located outside the processor and exist independently.

According to a seventeenth aspect, this application provides a computer program product. The computer program product includes a computer program (also referred to as code or instructions). When the computer program is run, a computer is enabled to perform the methods in the foregoing aspects.

According to an eighteenth aspect, this application provides a computer-readable medium. The computer-readable medium stores a computer program (also referred to as code or instructions). When the computer program is run on a computer, the computer is enabled to perform the methods in the foregoing aspects.

According to a nineteenth aspect, this application provides a communication system, including the session management network element, the terminal device, and the access and mobility management function network element described above.

DESCRIPTION OF EMBODIMENTS

The following describes technical solutions of this application with reference to the accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) system, a new radio (new radio, NR) system, or a future network. The 5G mobile communication system described in this application includes a non-standalone (non-standalone, NSA) 5G mobile communication system or a standalone (standalone, SA) 5G mobile communication system. The technical solutions provided in this application may be further applied to a future communication system, for example, a sixth generation mobile communication system. Alternatively, the communication system may be a public land mobile network (public land mobile network, PLMN), a device-to-device (device-to-device, D2D) communication system, a machine-to-machine (machine-to-machine, M2M) communication system, an internet of things (internet of Things, IoT) communication system, or another communication system.

Figure 1:
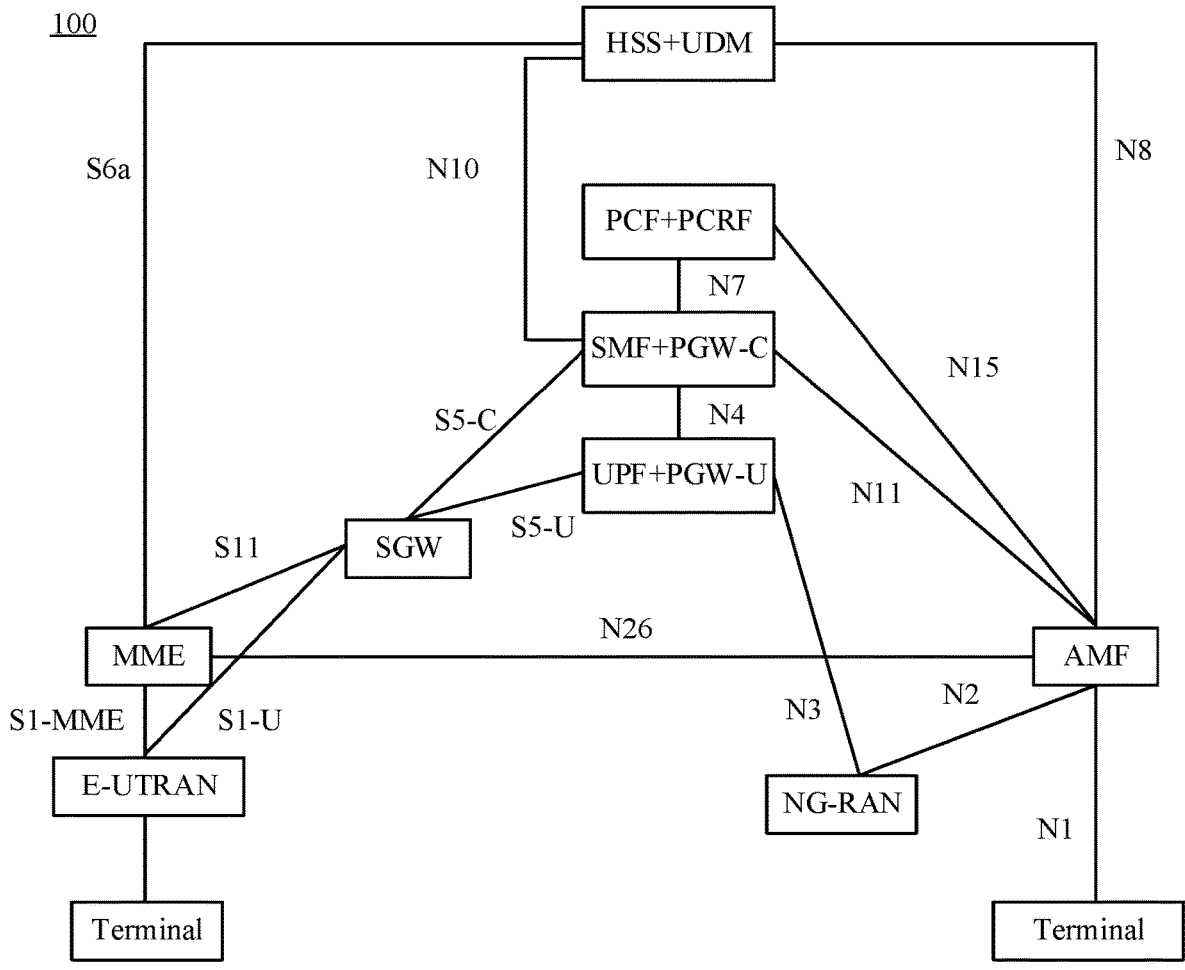
FIG. 1 is a schematic diagram of a network architecture to which an embodiment of this application is applicable.

FIG. 1 shows a network architecture to which an embodiment of this application is applicable. Specifically, a system architecture 100 may include network elements in a 4G network and network elements in a 5G network. Some modules in the system architecture 100 have functions of the network elements in the 4G network and functions of the network elements in the 5G network, for example, a user plane function (user plane function, UPF)+packet data network gateway for user plane (packet data network gateway for user plane, PGW-U) function entity, a session management function (session management function, SMF)+packet data network gateway control plane function (packet data network gateway control plane function, PGW-C) entity, a policy control function (policy control function, PCF)+policy and charging rules function (policy and charging rules function, PCRF) entity, and a home subscriber server (home subscriber server, HSS)+unified data management (unified data management, UDM) entity.

The UPF+PGW-U entity is used for user data transmission management. In the interworking system architecture, the module can not only be used for 4G data transmission, but also provide a 5G data transmission function.

The SMF+PGW-C entity is used for session establishment, deletion, and modification management. In the interworking system architecture, the module can provide both a 4G session management function and a 5G session management function.

The PCF+PCRF entity is used for policy and charging control. In the interworking system architecture, the module can provide a terminal with both 4G policy and charging control and 5G policy and charging control.

The HSS+UDM entity is configured to store subscription data of a user. In the interworking system architecture, the module stores both 4G subscription information and 5G subscription information of a terminal.

It should be understood that, "+" indicates integrated configuration. A UPF is a user plane function in the 5G network, and a PGW-U is a gateway user plane function that is in the 4G network that corresponds to the UPF; an SMF is a session management function in the 5G network, and a PGW-C is a gateway control plane function that is in the 4G network and that corresponds to the SMF; and a PCF is a policy control function in the 5G network, and a PCRF is a policy and charging rules function that is in the 4G network and that corresponds to the PCF. The "integrated configuration" herein means that a same network element may have functions of two network function entities.

In embodiments of this application, for ease of description, the HSS+UDM entity is referred to as a subscriber data management network element, the SMF+PGW-C is referred to as a session management network element, and the UPF+PGW-U is referred to as a user plane function network element. This is described herein for once, and details are not described below again. Certainly, the foregoing network devices obtained through integrated configuration may also use other names. This is not specifically limited in embodiments of this application.

In addition, the system architecture 100 may further include: a mobility management entity (mobility management entity, MME) and a serving gateway (serving gateway, SGW) in the 4G network, and an access and mobility management function (access and mobility management function, AMF) entity in the 5G network.

The MME is used for mobility management of a user. For example, the mobility management mainly includes attachment management, accessibility management, mobility management, paging management, access authentication and authorization, non-access stratum signaling encryption and integrity protection, and the like of the user.

The SGW is a user plane gateway, and is a user plane termination point of an evolved universal terrestrial radio access network (evolved universal terrestrial radio access network, E-UTRAN). The SGW manages data packet routing and transmission, adds a packet tag of a transport layer, and so on.

The AMF entity is used for access and mobility management of a user, mainly including registration management, accessibility management, mobility management, paging management, access authentication and authorization, non-access stratum signaling encryption and integrity protection, and the like of the user.

The terminal accesses the 4G network through the E-UTRAN, and the terminal accesses the 5G network via a next generation radio access network (next generation radio access network, NG-RAN) device.

The NG-RAN device is configured to provide the terminal with a radio air interface to access a core network, to obtain a corresponding service.

The E-UTRAN is configured to perform radio resource management, establish, modify, or delete an air interface resource, provide data and signaling transmission for the terminal, and the like for the terminal.

The following describes communication interfaces between the foregoing modules in the system architecture 100.

An S1-MME interface is a control plane interface between the MME and the E-UTRAN.

An S1-U interface is a user plane interface between the SGW and the E-UTRAN.

An S5-U interface is a user plane interface between the SGW and the PGW-U, and is configured to transmit user plane data of the terminal.

An S5-C interface is a control plane management interface between the SGW and the PGW-U, and is configured to establish a user plane connection between the SGW and the PGW-U for the terminal.

An S6a interface is an interface between the MME and an HSS, and is configured to obtain the subscription data of the user and perform an authentication and authorization function for the terminal.

An S11 interface is an interface between the SGW and the MME, and is configured to establish a user plane bearer.

An N1 interface is an interface between the terminal and the AMF, and is used for non-access stratum signaling management and transmission.

An N2 interface is an interface between the NG-RAN and the AMF, and is used for signaling transmission.

An N3 interface is an interface between the UPF and the NG-RAN, and is configured to transmit user data.

An N4 interface is an interface between the SMF and the UPF, and is configured to establish a user plane transmission channel.

An N7 interface is an interface between the SMF and the PCF, and is configured to formulate and deliver policy control and charging information.

An N8 interface is an interface between the AMF and a UDM, and is configured to obtain mobility-related subscription information of the user and the like.

An N10 interface is an interface between the SMF and the UDM, and is configured to obtain session management-related subscription information of the user and the like.

An N11 interface is an interface between the SMF and the AMF, and is used for transmission of session management information and the like.

An N15 interface is an interface between the AMF and the PCF, and is configured to obtain access and mobility-related policy information.

It should be understood that, in the system architecture 100, a first interface is introduced to support interworking between the 4G network and the 5G network. The first interface is a communication interface between the AMF in the 5G network and the MME in the 4G network, and may be represented by an N26 interface. The system architecture optionally supports the N26 interface. A handing over procedure can be used only in an interworking system architecture that supports the N26 interface, to ensure service continuity.

It should be noted that in the system architecture 100, names of the interfaces between the modules are merely examples, and the interfaces may have other names in a specific implementation. This is not specifically limited in embodiments of this application.

It should be further noted that in the system architecture 100, the NG-RAN device in the 5G network may also be referred to as an access device. The access device is a device that accesses the core network, and may be, for example, a base station, a broadband network service gateway (broadband network gateway, BNG), an aggregation switch, or a non-3rd generation partnership project (3rd generation partnership project, 3GPP) access device. The base station may be in various forms, for example, may be a macro base station, a micro base station (also referred to as a small cell), a relay station, or an access point. This is not limited in embodiments of this application.

Certainly, in the system architecture 100, other modules may be further included in the 4G network and the 5G network. For example, a serving general packet radio system (general packet radio system, GPRS) support node (serving GPRS support node, SGSN) module and the like may be further included in the 4G network, and an authentication server function (authentication server function, AUSF) module, a network slice selection function (network slice selection function, NSSF) module, and the like may be included in the 5G network. This is not limited in embodiments of this application.

The terminal (terminal) in embodiments of this application may include various handheld devices, vehicle-mounted devices, wearable devices, and computing devices that have a wireless communication function, or other processing devices connected to a wireless modem; and may further include a subscriber unit (subscriber unit), a cellular phone (cellular phone), a smartphone (smartphone), a wireless data card, a personal digital assistant (personal digital assistant, PDA) computer, a tablet computer, a wireless modem (modem), a handheld (handheld) device, a laptop computer (laptop computer), a cordless phone (cordless phone) or a wireless local loop (wireless local loop, WLL) station, a machine type communication (machine type communication, MTC) terminal, user equipment (user equipment, UE), a mobile station (mobile station, MS), a terminal device (terminal device), and the like. For ease of description, all the foregoing devices are collectively referred to as the terminal device in embodiments of this application.

It should be understood that, as the terminal device continuously moves, a location change of the terminal device may cause the terminal device to be handed over between different networks. For example, when moving from the 4G network to the 5G network, the terminal device needs to be handed over from an evolved packet system (evolved packet system, EPS) bearer (bearer) in the 4G network to a protocol data unit (protocol data network, PDU) session in the 5G network; or when moving from the 5G network to the 4G network, the terminal device needs to be handed over from a PDU session in the 5G network to an EPS bearer in the 4G network.

Currently, a security mechanism used in the 5G network is an on-demand user plane security protection mechanism, and on-demand user plane security protection includes user plane encryption protection and user plane integrity protection. In the on-demand user plane security protection mechanism, an access network device needs to determine, according to a user plane security policy received from a core network device, whether to activate user plane encryption protection and/or user plane integrity protection between the access network device and the terminal device. However, the existing 4G network does not support the on-demand user plane security protection mechanism. In the 4G network, a method for protecting user plane security between the access network device and the terminal device is fixed. To be specific, that user plane security is fixed means that user plane encryption protection is activated, and user plane integrity protection is not activated.

Therefore, if a user plane security policy corresponding to a PDU session in the 5G network requires that user plane integrity protection be activated, the PDU session cannot be handed over to the EPS bearer in the 4G network. This is because the access network device in the 4G network cannot activate user plane integrity protection for the terminal device.

Currently, the session management network element determines, based on the following factors, whether to request an EPS bearer identifier from the AMF for a PDU session requested to be established: (1) an access type is 3GPP access or non-3GPP access; (2) whether a user plane integrity protection policy of a session requested to be established in a first network is necessarily set to be activated; and (3) the session requested to be established in the first network supports interworking with a second network based on the N26 interface or supports interworking with a second network not based on the N26 interface. When the access type is the 3GPP access, the user plane integrity protection policy of the session requested to be established in the first network is not necessarily set to be activated, and the session requested to be established in the first network supports the interworking with the second network based on the N26 interface, the session management network element requests the EPS bearer identifier from the AMF for the PDU session requested to be established.

Currently, the session management network element determines, based on the following factors, whether to send a fully qualified domain name (fully qualified domain name, FQDN) of the session management network element on an S5/S8 interface to a unified data management network element: (1) whether the terminal device supports the interworking with the second network; (2) whether the user plane integrity protection policy of the session requested to be established in the first network is necessarily set to be activated; and (3) whether the session requested to be established in the first network supports the interworking with the second network. When the terminal device supports the interworking with the second network, the user plane integrity protection policy of the session requested to be established in the first network is not necessarily set to be activated, and the session requested to be established in the first network supports the interworking with the second network, the session management network element sends the FQDN of the session management network element on the S5/S8 interface to the unified data management network element; otherwise, does not send the FQDN of the session management network element on the S5/S8 interface.

Based on this, in a process of preparing an EPS bearer context (EPS bearer context) in the network, if the user plane security policy corresponding to the PDU session includes activating user plane integrity, the session management network element does not request an EPS bearer identifier (EPS bearer identifier, EBI) for the EPS bearer context from the AMF, and the session management network element does not send the fully qualified domain name of the session management network element on the S5/S8 interface to the UDM. Further, the PDU session cannot be handed over to the EPS bearer.

The 4G network will not retire in a short term. In this case, once the 4G network also supports user plane integrity protection, how to remove a limitation that the 5G network cannot interwork (interworking) with the EPS when the 5G network has a requirement for forcibly activating user plane integrity protection becomes an urgent problem to be resolved.

In addition, although it has been proposed that, in a process in which the PDU session in the 5G network is handed over to the EPS bearer in the 4G network, a forward relocation request (forward relocation request) message sent by the AMF to a target MME may carry the user plane security policy of the terminal device in the 4G network, how the AMF obtains the user plane security policy of the terminal device in the 4G network is not resolved. This is because the user plane security policy of the terminal device in the 5G network is at a granularity of the PDU session, but the user plane security policy of the terminal device in the 4G network is at a granularity of an E-UTRAN radio access bearer (E-UTRAN radio access bearer, E-RAB).

In view of this, this application provides a communication method, to remove a limitation that a 5G network cannot interwork with an EPS when the 5G network has a requirement of forcibly activating user plane integrity protection.

It should be understood that a specific structure of an execution body of a method provided in embodiments of this application is not particularly limited in the following embodiments provided that a program that records code for the method in embodiments of this application can be run to perform communication according to the method provided in embodiments of this application. For example, the method provided in embodiments of this application may be performed by a terminal device, a core network device, or a functional module that is in a terminal device or a core network device and that can invoke and execute the program.

It should be further noted that in the following embodiments, a session management network element is a network element in a first network and a network element in a second network. To be specific, the session management network element may communicate with a network element in another first network in the first network, or may communicate with a network element in another second network in the second network. An access and mobility management function network element is a network element in the first network, and a mobility management function entity is a network element in the second network. In a process in which the terminal device is handed over from the first network to the second network, the access and mobility management function network element in the first network may communicate with a target mobility management function entity in the second network.

The first network may be a 5G network, and the second network may be a 4G network; or the first network may be a 4G network, and the second network may be a 5G network.

Figure 2:
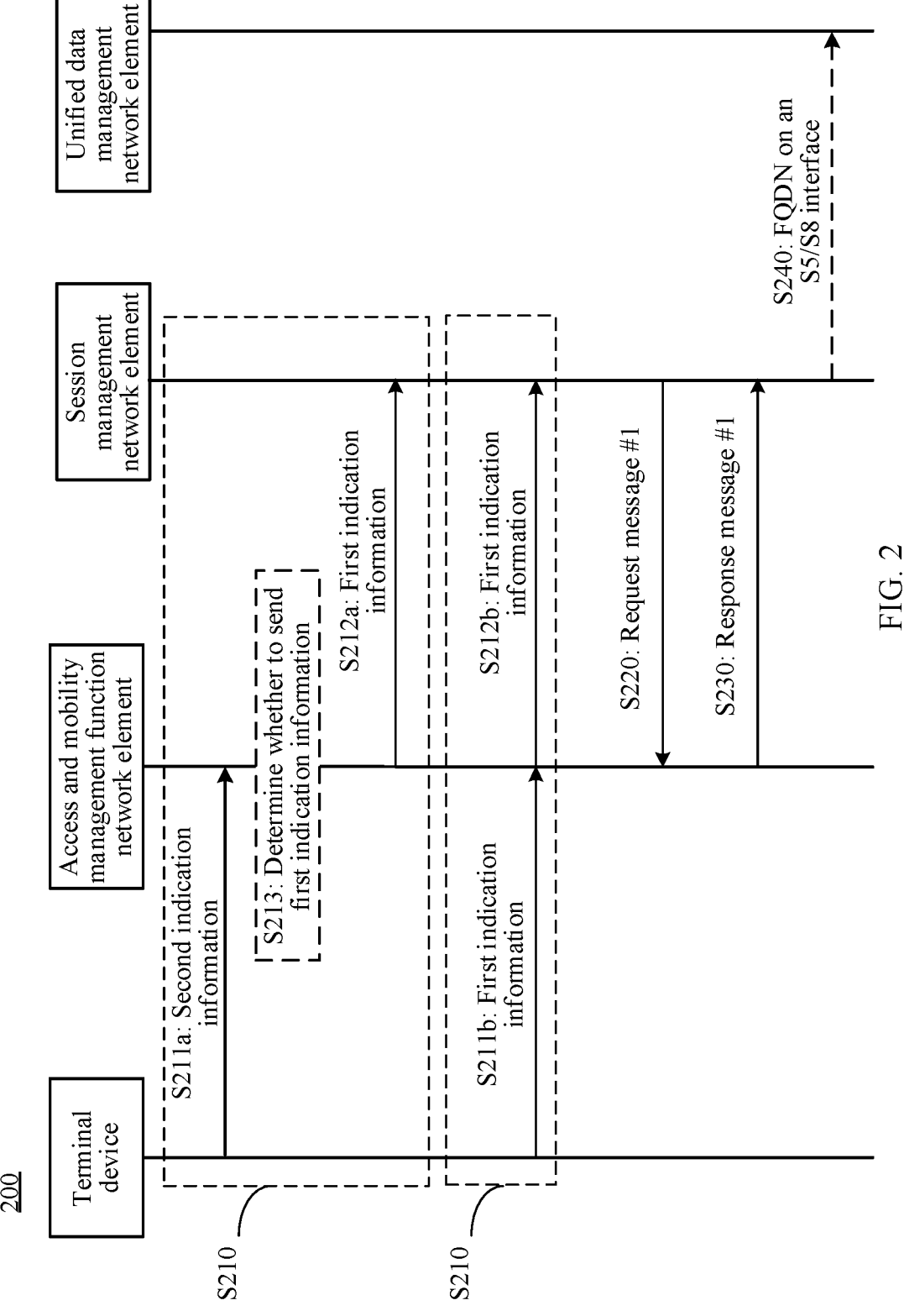
FIG. 2 is a schematic flowchart of a communication method according to an embodiment of this application.

FIG. 2 is a schematic flowchart of a communication method according to an embodiment of this application. As shown in FIG. 2, the method 200 may include S210 to S240. The following describes steps in detail.

S210: A session management network element obtains first indication information.

Specifically, in a process of session establishment in a first network for a terminal device, the session management network element obtains the first indication information. The process of the session establishment in the first network for the terminal device includes a process in which the terminal device completes session establishment with the network after the terminal device sends a session establishment request message. For example, the session is a protocol data unit (protocol data unit, PDU) session, and the process of establishing the PDU session includes a process in which the terminal device completes PDU session establishment after the terminal device sends a PDU session establishment request message. For example, for the process of the PDU session establishment, refer to related content in section 4.3.2 in the 3GPP technical specification (technical specification, TS) 23.502.

The first indication information indicates that user plane integrity protection in a second network is supported. Alternatively, the first indication information indicates that user plane integrity protection with an access network device in a second network is supported. Alternatively, the first indication information indicates that on-demand user plane protection with an access network device in a second network is supported. The on-demand user plane protection means that the access network device in the second network may determine, according to a user plane security policy received from a core network device, whether to activate user plane encryption protection and/or user plane integrity protection with the terminal device. Alternatively, the first indication information indicates that interworking of a user plane security policy between the first network and a second network is supported, in other words, indicates that the terminal device supports mapping of the user plane security policy between the first network and the second network. In other words, supporting user plane integrity protection in the second network may be replaced with supporting user plane integrity protection with the access network device in the second network, supporting the on-demand user plane protection with the access network device in the second network, supporting the interworking of the user plane security policy between the first network and the second network, or supporting the mapping of the user plane security policy between the first network and the second network.

A manner in which a session management network element obtains first indication information is not limited in this embodiment of this application.

In an example, the session management network element receives the first indication information from an access and mobility management function network element. In this example, S210 may include:

S211a: A terminal device sends second indication information to the access and mobility management function network element. Correspondingly, in S211a, the access and mobility management function network element receives the second indication information.

The second indication information indicates that the terminal device supports user plane integrity protection in a second network.

Alternatively, the second indication information indicates that the terminal device supports user plane integrity protection with an access network device in a second network. Alternatively, the second indication information indicates that the terminal device supports on-demand user plane protection with an access network device in a second network. The on-demand user plane protection means that the access network device in the second network may determine, according to a user plane security policy received from a core network device, whether to activate user plane encryption protection and/or user plane integrity protection with the terminal device. Alternatively, the second indication information indicates that the terminal device supports interworking of a user plane security policy between a first network and a second network, in other words, indicates that the terminal device support smapping of the user plane security policy between the first network and the second network.

In other words, that the terminal device supports user plane integrity protection in a second network may be replaced with that the terminal device supports user plane integrity protection with the access network device in the second network, the terminal device supports the on-demand user plane protection with the access network device in the second network, the terminal device supports the interworking of the user plane security policy between the first network and the second network, or the terminal device supports the mapping of the user plane security policy between the first network and the second network.

For example, the second indication information sent by the terminal device to the access and mobility management function network element may be included in a registration request (registration request) message. For example, the second indication information may be carried in a 5G mobility management (mobile management, MM) capability, a UE security capability, or an S1 UE network capability.

S212a: The access and mobility management function network element sends first indication information based on the second indication information. Correspondingly, in S212a, the session management network element receives the first indication information.

The first indication information and the second indication information may be the same. For example, the second indication information indicates that the terminal device supports user plane integrity protection with the access network device in the second network, and the first indication information also indicates that the terminal device supports user plane integrity protection with the access network device in the second network.

Alternatively, the first indication information and the second indication information may be different. For example, the second indication information indicates that the terminal device supports the on-demand user plane protection with the access network device in the second network, and the first indication information indicates that the mapping of the user plane security policy between the first network and the second network is supported.

In other words, after receiving the second indication information sent by the terminal device, the access and mobility management function network element may send the second indication information as the first indication information to the session management network element.

Alternatively, after receiving the second indication information sent by the terminal device, the access and mobility management function network element generates the first indication information based on the second indication information, and sends the first indication information to the session management network element.

For example, the first indication information may be included in a PDU session session management context establishment request (Nsmf_PDUSession_CreateSMContext Request) message, or a PDU session context request (Nsmf_PDUSession_Context Request) message.

Optionally, in this example, the method S210 may further include S213: The access and mobility management function network element determines, according to a local policy #1, whether to send the first indication information to the session management network element.

Specifically, with reference to another embodiment, the following describes in detail how the access and mobility management function network element determines, according to a local policy #1 (an example of a first local policy), whether to send the first indication information to the session management network element. For brevity, details are not described herein.

In another example, the session management network element receives the first indication information from the terminal device via an access and mobility management function network element. In this example, S210 may include:

S211b and S212b: The terminal device sends the first indication information to the session management network element via the access and mobility management function network element.

For example, the terminal device sends a PDU session establishment request (PDU Session Establishment Request) message to the session management network element via the access and mobility management function network element, where the PDU session establishment request (PDU Session Establishment Request) message includes the first indication information.

In a possible implementation, the terminal device sends a non-access stratum (non-access stratum, NAS) message to the access and mobility management function network element, where the NAS message includes an N1 session management (session management, SM) container, and the N1 SM container includes the first indication information. The access and mobility management function network element sends the N1 SM container to the session management network element. Optionally, the N1 SM container includes the PDU session establishment request, and the PDU session establishment request includes the first indication information.

S220: The session management network element sends a request message #1 (an example of a first request message) to the access and mobility management function network element based on the first indication information. Correspondingly, in S220, the access and mobility management function network element receives the request message #1.

The request message #1 is used to request a bearer identifier, the bearer identifier corresponds to a bearer context, and the bearer context corresponds to a second network.

Optionally, the request message #1 includes a session identifier, and the request message #1 is used to request to assign a bearer identifier to this session.

For example, the first network is a 5G network, the second network is a 4G network, the session is a PDU session, the session identifier is a PDU session ID, a bearer is an EPS bearer, the bearer identifier is an EBI, and the request message #1 is an EBI assignment request (Namf_Communication_EBIAssignment Request) message.

Optionally, when the first indication information indicates that user plane integrity protection with an access network device in the second network is supported, the session management network element sends the request message #1 to the access and mobility management function network element based on the first indication information.

Specifically, that the session management network element sends a request message #1 to the access and mobility management function network element based on the first indication information includes: The session management network element sends the request message #1 to the access and mobility management function network element based on the first indication information without considering a user plane security policy of the terminal device in the first network. For example, that the session management network element does not consider a user plane security policy of the terminal device in the first network means that the session management network element does not consider a value of a user plane integrity protection policy of the terminal device in the first network. In other words, regardless of which one of the following three values is the value of the user plane integrity protection policy of the terminal device in the first network: "required (required)", "not needed (not needed)", and "preferred (preferred)", when a session in the first network supports interworking with the second network, the session management network element sends the request message #1 to the access and mobility management function network element based on the first indication information.

In a possible implementation, the session management network element determines, based on the first indication information, that the user plane security policy of the terminal device in the first network has no limitation on whether the session established for the terminal device in the first network can be handed over to the second network.

In a possible implementation, the session management network element further receives an N26 interface-based interworking indication of the second network from the access and mobility management function network element, where the N26 interface-based interworking indication of the second network indicates that the session requested to be established supports N26 interface-based interworking with the second network. The session management network element further receives an access type from the access and mobility management function network element, where the access type indicates whether 3GPP access or non-3GPP access is currently used. When the access type is 3GPP access, and the N26 interface-based interworking indication of the second network indicates that the session requested to be established supports the N26 interface-based interworking with the second network, if the session management network element receives the first indication information, the session management network element directly determines, without considering the user plane security policy of the terminal device in the first network, that the session of the terminal device in the first network supports EPS interworking.

After determining that the session of the terminal device in the first network supports the EPS interworking, to subsequently hand over the session to the second network, the session management network element may perform S220 and S230 to request the access and mobility management function network element to assign the bearer identifier to the session.

S230: The access and mobility management function network element sends a response message #1 (an example of a first response message) in response to the request message #1. Correspondingly, in S230, the session management network element receives the response message #1.

The response message #1 includes the bearer identifier assigned by the access and mobility management function network element to the session, the bearer identifier may be identified by the second network, the first network is the 5G network, the second network is the 4G network, and the bearer identifier is an EBI. For example, the response message #1 is an EBI assignment response (Namf_Communication_EBIAssignment Response) message.

In this embodiment of this application, the session management network element can remove, based on the first indication information, a limitation that the session established for the terminal device in the first network cannot be handed over to the second network when the user plane security policy in the first network requires that user plane integrity protection be activated. According to the existing solution, when the user plane security policy in the first network requires that user plane integrity protection be activated, the session management network element does not request the bearer identifier from the access and mobility management function network element. Therefore, the access and mobility management function network element does not locally store the corresponding bearer identifier. In this case, when subsequently receiving a handing over requirement from an access network device in the first network, the access and mobility management function network element does not perform a related procedure of handing over the session established for the terminal device in the first network to the second network.

Optionally, the method 200 may further include S240: The session management network element sends an FQDN of the session management network element on an S5/S8 interface to the unified data management network element based on the first indication information.

Optionally, when the first indication information indicates that user plane integrity protection with the access network device in the second network is supported, the session management network element sends the fully qualified domain name of the session management network element on the S5/S8 interface to the unified data management network element.

Specifically, that the session management network element sends an FQDN of the session management network element on an S5/S8 interface to the unified data management network element based on the first indication information includes: The session management network element sends the FQDN of the session management network element on the S5/S8 interface to the unified data management function network element based on the first indication information without considering the user plane security policy in the first network. For example, that the session management network element does not consider a user plane security policy of the terminal device in the first network means that the session management network element does not consider a value of a user plane integrity protection policy of the terminal device in the first network. In other words, regardless of which one of the following three values is the value of the user plane integrity protection policy of the terminal device in the first network: "required", "not needed", and "preferred", when a session in the first network supports interworking with the second network, the session management network element sends the FQDN of the session management network element on the S5/S8 interface to the unified data management user plane function network element based on the first indication information.

In a possible implementation, the session management network element further receives an EPS interworking indication (EPS interworking indication) from the access and mobility management function network element, where the EPS interworking indication indicates that the terminal device supports the EPS interworking. The session management network element further determines, based on subscription data of the terminal device, that the session of the terminal device in the first network allows the EPS interworking. When the terminal device supports the EPS interworking, and the session of the terminal device in the first network allows the EPS interworking, if the session management network element receives the first indication information, the session management network element directly determines, without considering the user plane security policy of the terminal device in the first network, that the session of the terminal device in the first network supports the EPS interworking.

After determining that the session of the terminal device in the first network supports the EPS interworking, to subsequently hand over the session to the second network, the session management network element may further perform S240 to store the FQDN of the session management network element in the unified data management network element.

In this embodiment of this application, the session management network element sends the FQDN of the session management network element on the S5/S8 interface to the unified data management network element based on the first indication information, so as to remove a limitation that the session established for the terminal device in the first network cannot be handed over to the second network when the user plane security policy in the first network requires that user plane integrity protection be activated. According to the existing solution, when the user plane security policy in the first network requires that user plane integrity protection be activated, the session management network element does not send the FQDN of the session management network element on the S5/S8 interface to the unified data management network element. Therefore, the session established for the terminal device in the first network cannot be subsequently handed over to the second network.

In the foregoing embodiment, a limitation that the session established for the terminal device in the first network cannot support the EPS interworking when the user plane security policy in the first network requires that user plane integrity protection be activated is removed, but how a device (for example, a mobility management entity in the second network or an access device in the second network) in the second network obtains the user plane security policy of the terminal device in the second network is still not resolved.

In view of this, an embodiment of this application further provides a communication method, so that in a process of handing over a session established for a terminal device in a first network to a second network, a device in the second network can obtain a user plane security policy of the terminal device in the second network. In this way, the session of the terminal device in the first network can be successfully handed over to the second network.

Figure 3:
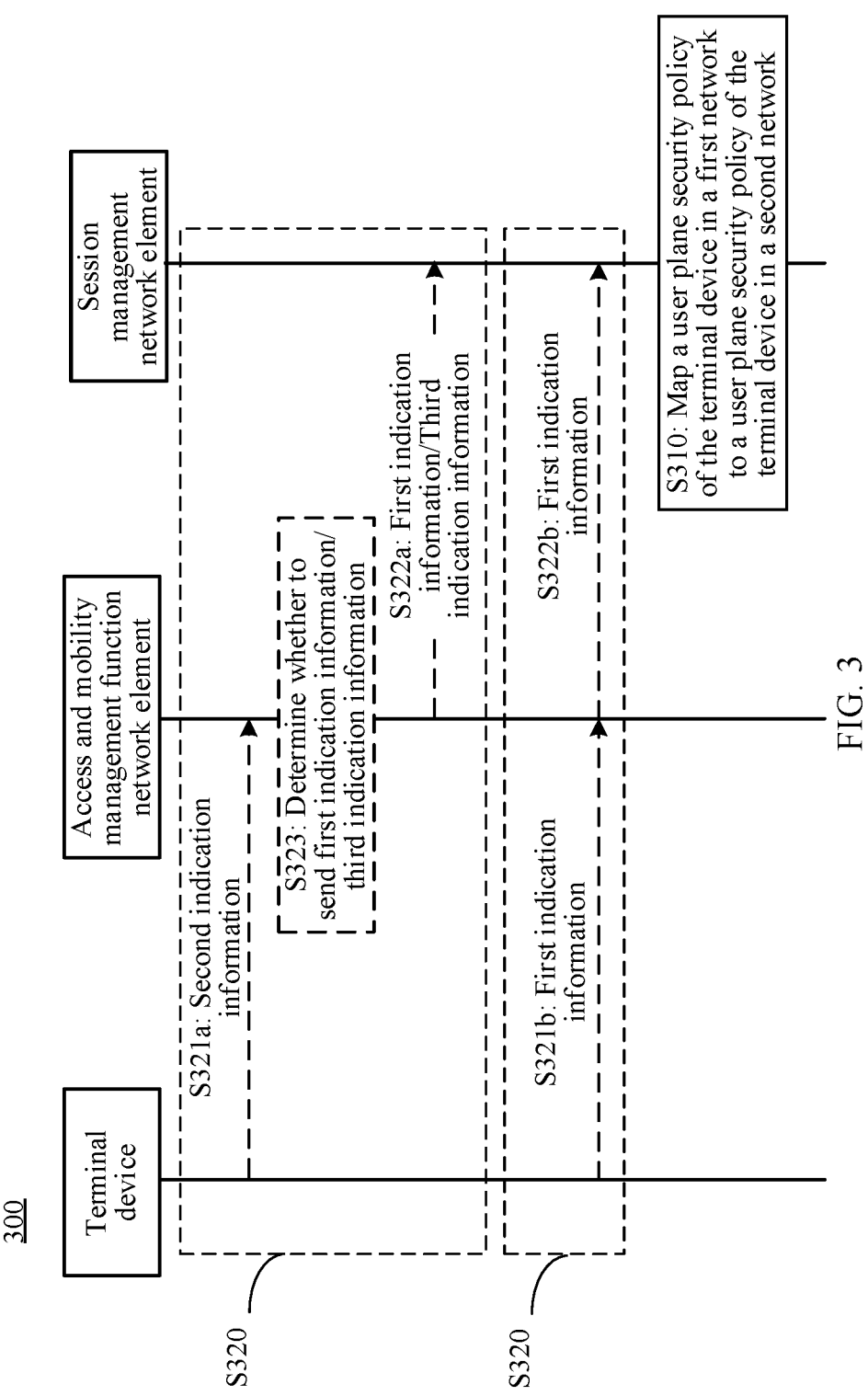
FIG. 3 is a schematic flowchart of a communication method according to another embodiment of this application.

FIG. 3 is a schematic flowchart of a communication method according to an embodiment of this application. As shown in FIG. 3, the method 300 may include S310 and S320. The following describes steps in detail.

S310: A session management network element maps a user plane security policy of a terminal device in a first network to a user plane security policy of the terminal device in a second network.

For example, the first network may be a 5G network, and the second network may be a 4G network.

The user plane security policy of the terminal device in the first network/second network may include a user plane encryption protection policy and a user plane integrity protection policy. The user plane encryption protection policy indicates whether to activate user plane encryption protection. The user plane encryption protection policy has three possible values: "required", "preferred", and "not needed". "Required" indicates that the protection needs to be activated, "preferred" indicates that the protection can be activated or cannot be activated, and "not needed" indicates that the protection does not need to be activated. The user plane integrity protection policy indicates whether to activate user plane integrity protection. The user plane integrity protection policy also has three possible values: "required", "preferred", and "not needed". "Required" indicates that the protection needs to be activated, "preferred" indicates that the protection can be activated or cannot be activated, and "not needed" indicates that the protection does not need to be activated. The foregoing three possible values each may be indicated by using two bits (bits). For example, 00 indicates that the protection does not need to be activated, 01 indicates that the protection can be activated or cannot be activated, and 10 indicates that the protection needs to be activated.

For example, a granularity of the user plane security policy of the terminal device in the first network may be any one of the following granularities: a granularity of a protocol data unit (protocol data unit, PDU) session and a granularity of a data network name (data network name, DNN).

For example, a granularity of the user plane security policy of the terminal device in the second network may be any one of the following granularities: a granularity of an EPS bearer, a granularity of an E-RAB, and a granularity of an access point name (access point name, APN).

A manner in which the session management network element obtains the user plane security policy of the terminal device in the first network is not limited in this embodiment of this application. For example, the user plane security policy of the terminal device in the first network may be locally stored by the session management network element. For another example, the user plane security policy of the terminal device in the first network may be obtained from a unified data management network element. With reference to another embodiment, the following describes in detail a method in which the session management network element obtains the user plane security policy of the terminal device in the first network from the unified data management network element. For brevity, details are not described herein.

The mapping a user plane security policy of a terminal device in a first network to a user plane security policy of the terminal device in a second network may be understood as: converting the user plane security policy that can be identified by the first network into the user plane security policy that can be identified by the second network, or storing the user plane security policy in the first network in a context that can be identified by the second network. For example, the user plane security policy that can be identified by the first network is at the granularity of the DNN or the granularity of the PDU session. The user plane security policy that can be identified by the second network is at the granularity of the EPS bearer, the granularity of the E-RAB, or the granularity of the APN. The DNN and the PDU session may be in a one-to-many relationship, the PDU session and the EPS bearer may be in a one-to-many relationship, the DNN and the APN may be in a one-to-one relationship, the APN and the EPS bearer may be in a one-to-many relationship, and the EPS bearer and the E-RAB may be in a one-to-many relationship.

The user plane security policy that is of the terminal device in the first network and that is locally stored by the session management network element or is obtained from the unified data management network element may be at a granularity of a DNN+single network slice selection assistance information (single network slice selection assistance information, S-NSSAI). If the user plane security policy of the terminal device in the second network obtained by the session management network element through mapping in S310 is at the granularity of the EPS bearer, the session management network element first maps the user plane security policy of the terminal device in the first network at the granularity of the DNN+S-NSSAI to the user plane security policy at the granularity of the PDU session, and then maps the user plane security policy of the terminal device in the first network at the granularity of the PDU session to the user plane security policy of the terminal device in the second network at the granularity of the EPS bearer. If the user plane security policy of the terminal device in the second network obtained by the session management network element through mapping in S310 is at the granularity of the APN, the session management network element maps the user plane security policy of the terminal device in the first network at the granularity of the DNN to the user plane security policy of the terminal device in the second network at the granularity of the APN.

The user plane security policy that is of the terminal device in the first network and that is locally stored by the session management network element or is obtained from the unified data management network element may be at the granularity of the PDU session. If the user plane security policy of the terminal device in the second network obtained by the session management network element through mapping in S310 is at the granularity of the EPS bearer, the session management network element maps the user plane security policy at the granularity of the PDU session to the user plane security policy of the terminal device in the second network at the granularity of the EPS bearer. If the user plane security policy of the terminal device in the second network obtained by the session management network element through mapping in S310 is at the granularity of the E-RAB, the session management network element obtains the user plane security policy of the terminal device in the second network at the granularity of the EPS bearer in the foregoing manner, and then maps the user plane security policy of the terminal device in the second network at the granularity of the EPS bearer to the user plane security policy at the granularity of the E-RAB.

For example, an implementation in which the session management network element stores the user plane security policy in the first network to a context that can be identified by the second network may include: The session management network element obtains a user plane security policy 1 of the terminal device in the first network, where the user plane security policy 1 corresponds to a PDU session 1; and stores the user plane security policy 1 to an EPS bearer context corresponding to the PDU session 1.

For another example, an implementation in which the session management network element stores the user plane security policy in the first network to a context that can be identified by the second network may include: The session management network element obtains a user plane security policy 1 of the terminal device in the first network, where the user plane security policy 1 corresponds to a DNN 1+S-NSSAI 1; determines a PDU session 1 and a PDU session 1 that correspond to the DNN 1+S-NSSAI 1; and stores the user plane security policy 1 in an EPS bearer context 1 corresponding to the PDU session 1, and stores the user plane security policy 1 in an EPS bearer context 2 corresponding to the PDU session 2.

Optionally, the session management network element may perform S310 in a process of handing over the terminal device from the first network to the second network. For details, refer to descriptions in the following method 700. Optionally, the session management network element may perform S310 before the terminal device is handed over from the first network to the second network. For details, refer to descriptions in the following method 500 and method 600.

When obtaining the user plane security policy of the terminal device in the first network, the session management network element may map the user plane security policy in the first network to the user plane security policy of the terminal device in the second network; or when obtaining third indication information/the first indication information, the session management network element may map the user plane security policy of the terminal device in the first network to the user plane security policy of the terminal device in the second network.

When the session management network element maps the user plane security policy of the terminal device in the first network to the user plane security policy of the terminal device in the second network based on the third indication information/the first indication information, the method 300 further includes S320: The session management network element obtains the third indication information/the first indication information.

For descriptions of the first indication information and descriptions of obtaining the first indication information by the session management network element, refer to the foregoing descriptions in S210. For brevity, details are not described herein again.

The third indication information indicates the session management network element to map the user plane security policy in the second network. For more descriptions of the third indication information and descriptions of obtaining the third indication information by the session management network element, refer to descriptions in S718 in FIG. 7(a) and FIG. 7(b). For brevity, details are not described herein again.

Optionally, the method 300 may further include: The session management network element stores the user plane security policy of the terminal device in the second network in a bearer context of the terminal device in the second network.

Optionally, the method 300 may further include: The session management network element locally stores the user plane security policy of the terminal device in the second network, and stores a binding relationship between the user plane security policy of the terminal device in the second network and the bearer context.

In this embodiment of this application, the session management network element may map the user plane security policy of the terminal device in the first network to the user plane security policy of the terminal device in the second network, and may store the user plane security policy of the terminal device in the second network in the bearer context. Further, in a process in which the terminal device is handed over from the first network to the second network, the access and mobility management function network element in the first network obtains the bearer context from the session management network element, and further sends the obtained bearer context to a mobility management entity in the second network, so that the terminal device is handed over from the first network to the second network.

In addition, when receiving the third indication information, the session management network element maps the user plane security policy of the terminal device in the first network to the user plane security policy of the terminal device in the second network, so that the session management network element can be prevented from performing unnecessary mapping, and processing logic of the session management network element is optimized. When the session management network element does not receive the third indication information, the session management network element directly maps the user plane security policy of the terminal device in the first network to the user plane security policy of the terminal device in the second network. If the second network does not support the activation of user plane integrity protection, the terminal device cannot be handed over from the first network to the second network, and mapping performed by the session management network element is unnecessary mapping.

With reference to FIG. 4 to FIG. 7(a) and FIG. 7(b), the following describes in detail, by using an example in which a terminal device is handed over from 5G to 4G, a communication method provided in embodiments of this application. It should be understood that, the following source AMF corresponds to the foregoing access and mobility management function network element, an SMF+PGW-C corresponds to the foregoing session management network element, UE corresponds to the foregoing terminal device, and a UDM corresponds to the foregoing unified data management network element. It should be further understood that the following UE capability indication may correspond to the foregoing second indication information or first indication information, indication information #1 may correspond to the foregoing first indication information, and indication information #2 may correspond to the foregoing third indication information.

Figure 4:
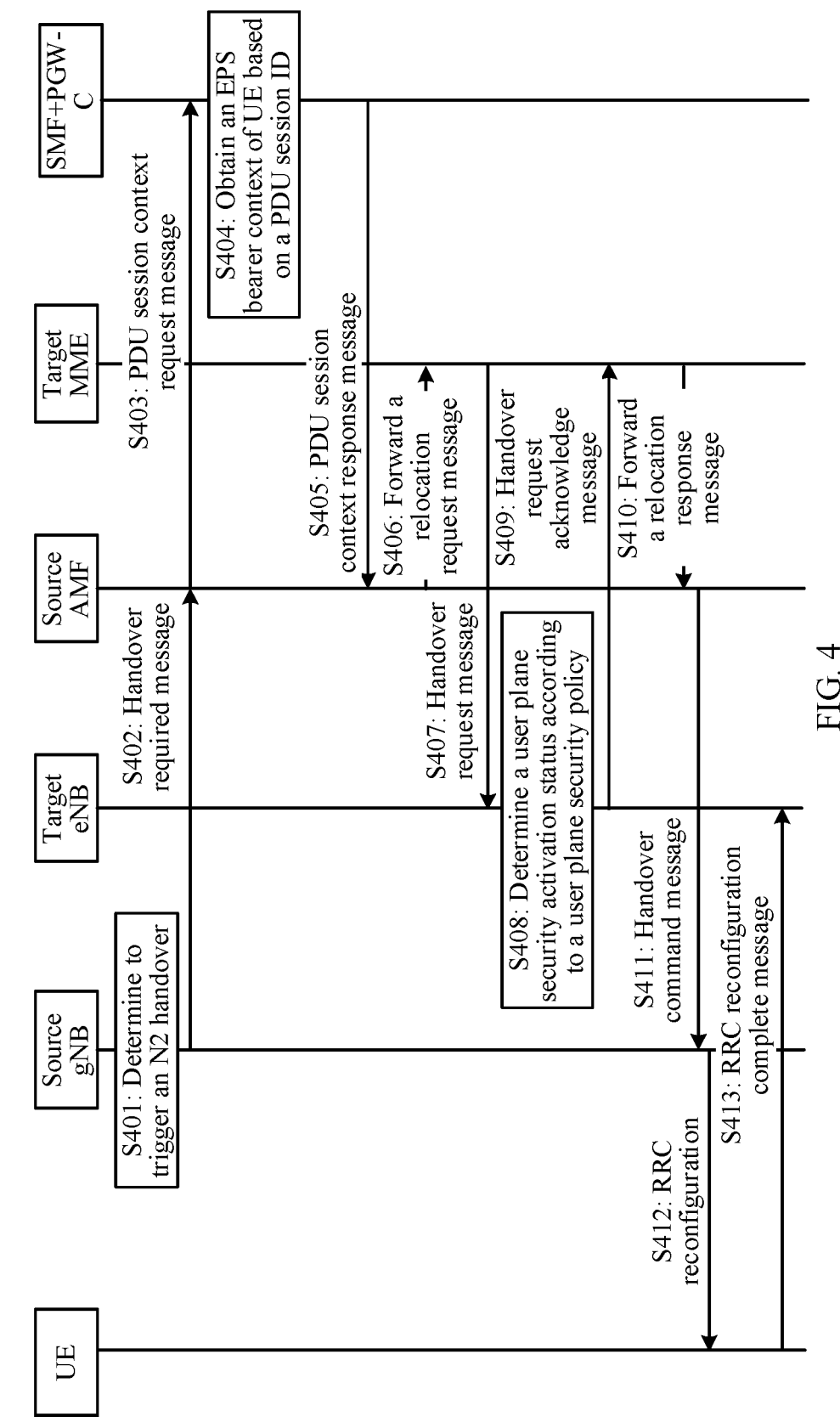
FIG. 4 is a schematic flowchart of a communication method according to another embodiment of this application.

FIG. 4 is a schematic flowchart of a method according to an embodiment of this application. Specifically, FIG. 4 is a flowchart of how a source AMF obtains a user plane security policy in a 4G network from an SMF+PGW-C in a process in which UE is handed over from a 5G network to the 4G network. As shown in FIG. 4, the method 400 includes S401 to S413. The following describes steps in detail.

S401: A source next generation node base station (next generation Node Base station, gNB) determines to trigger an N2 handover.

The UE accesses the 5G network via the source gNB, and a PDU session in the 5G network is established; and the source gNB determines to initiate a handover from a 5G system (5G system, 5GS) to an EPS, so that the UE is handed over to an eNB in the 4G network. The eNB in the 4G network is denoted as the following target eNB.

In a process in which the UE accesses the 5G network, the source gNB obtains a user plane security policy of the UE in the 5G network from a core network side, and activates user plane security between the source gNB and the UE by using the user plane security policy of the UE in the network. The source gNB further stores the obtained user plane security policy of the UE in the network in an access stratum (access stratum, AS) context of the UE.

When the source gNB determines that the UE needs to be handed over to the target eNB, the handover from the 5GS to the EPS may be triggered based on the following conditions: (1) a current poor wireless network status; (2) load balancing; and (3) a voice service requirement.

S402: The source gNB sends a handover required (handover required) message to a source AMF.

The handover required message carries an identifier of the UE. The identifier of the UE is used to obtain a context of the UE. The identifier of the UE may include: a unique identifier (gNB UE NG application protocol identifier, gNB UE NGAP ID) of a terminal device on an NG interface on a source gNB side or a unique identifier (AMF UE NG application protocol identifier, AMF UE NGAP ID) of a terminal device on an NG interface on a source AMF side.

S403: The source AMF sends a PDU session context request (Nsmf_PDUSession_Context Request) message (an example of a second request message) to the SMF+PGW-C.

Before sending the PDU session context request message to the SMF+PGW-C, the source AMF determines, according to a local policy #2, whether to obtain an EPS bearer context from the SMF+PGW-C. If the source AMF determines, according to the local policy #2, to obtain the EPS bearer context from the SMF+PGW-C, the source AMF sends the PDU session context request message to the SMF+PGW-C. The PDU session context request message includes a PDU session ID.

The local policy #2 of the source AMF may include: The source AMF has assigned an EBI to a PDU session to be handed over. Specifically, the source AMF obtains the context of the UE based on the identifier of the UE. Further, the source AMF obtains, based on the context of the UE, a PDU session that needs to be handed over, and determines whether the EBI has assigned to the PDU session.

It should be noted that, according to the embodiment shown in FIG. 2, when the PDU session in the 5G network is established for the UE, and the SMF+PGW-C determines that the PDU session supports a handover to the EPS, S220 and S230 are performed to request the AMF to assign the EBI to the PDU session. After assigning the EBI to the PDU session, the AMF may store the assigned EBI in the context of the UE.

S404: The SMF+PGW-C obtains an EPS bearer context of the UE based on the PDU session ID.

In a possible implementation, according to the embodiment shown in FIG. 3, the EPS bearer context of the UE already stores the user plane security policy of the UE in the 4G network.

In another possible implementation, according to the embodiment shown in FIG. 3, the SMF+PGW-C may locally store the user plane security policy of the UE in the 4G network, and store a correspondence between the user plane security policy of the UE in the 4G network and the EPS bearer context. In this case, the SMF+PGW-C may determine the corresponding EPS bearer context based on the PDU session ID, and then obtain the user plane security policy of the UE in the 4G network based on the EPS bearer context.

The user plane security policy of the UE in the 4G network includes a user plane encryption protection policy and a user plane integrity protection policy. The user plane encryption protection policy indicates whether to activate user plane encryption protection, and the user plane integrity protection policy indicates whether to activate user plane integrity protection. The user plane encryption protection policy has three possible values: "not needed", "preferred", and "required"; and the user plane integrity protection policy has three possible values: "not needed", "preferred", and "required". "Not needed" indicates that protection does not need to be activated, "preferred" indicates that protection can be activated or cannot be activated, and "required" indicates that protection needs to be activated. The foregoing three possible values each may be indicated by using two bits (bits). For example, 00 indicates that the protection does not need to be activated, 01 indicates that the protection can be activated or cannot be activated, and 11 indicates that the protection needs to be activated.

The user plane security policy of the UE in the 4G network may be at a granularity of an EPS bearer/E-RAB/APN. For example, a form of the EPS bearer context is {EPS bearer 1: user plane security policy 1}; {E-RAB 1: user plane security policy 1}; or {APN 1: user plane security policy 1}. {EPS bearer 1: user plane security policy 1} indicates that the EPS bearer 1 corresponds to the user plane security policy 1, in other words, the user plane security policy 1 is at the granularity of the EPS bearer. {E-RAB 1: user plane security policy 1} indicates that the E-RAB 1 corresponds to the user plane security policy 1, in other words, the user plane security policy 1 is at the granularity of the E-RAB. {APN 1: user plane security policy 1} indicates that the APN 1 corresponds to the user plane security policy 1, in other words, the user plane security policy 1 is at the granularity of the APN.

S405: The SMF+PGW-C sends a PDU session context response (Nsmf_PDUSession_Context Response) message (an example of a second response message) to the source AMF.

In a possible implementation, the PDU session context response message includes the EPS bearer context, and the EPS bearer context includes the user plane security policy of the UE in the 4G network.

In another possible implementation, the PDU session context response message includes the EPS bearer context and the user plane security policy of the UE in the 4G network.

S406: The source AMF sends a forward relocation request (forward relocation request) message to a target MIME.

In a possible implementation, the forward relocation request message includes the EPS bearer context, and the EPS bearer context includes the user plane security policy of the UE in the 4G network.

In another possible implementation, the forward relocation request message includes the EPS bearer context and the user plane security policy of the UE in the 4G network.

S407: The target MME sends a handover request (handover request) message to the target eNB (an access network device in the 4G network).

The handover request message includes the user plane security policy of the UE in the 4G network.

In a possible implementation, the target MME obtains the user plane security policy of the UE in the 4G network based on the EPS bearer context. Optionally, if the user plane security policy that is of the UE in the 4G network and that is obtained by the target MME is at the granularity of the EPS bearer/APN, the target MME maps the user plane security policy at the granularity of the EPS bearer/APN to the user plane security policy at the granularity of the E-RAB.

S408: The target eNB determines a user plane security activation status of the UE in the 4G network according to the user plane security policy of the UE in the 4G network.

The user plane security activation status indicates whether to activate user plane encryption protection and/or user plane integrity protection. The target eNB determines a user plane security activation status at a granularity of a data radio bearer (data radio bearer, DRB) according to the user plane security policy at the granularity of the E-RAB. A relationship between the E-RAB and the DRB is a one-to-many mapping relationship. For example, the target eNB obtains a DRB 1 and a DRB 2 through mapping from the E-RAB 1, determines a user plane security activation status of the DRB 1 according to the user plane security policy 1 corresponding to the E-RAB 1, and then determines a user plane security activation status of the DRB 2 according to the user plane security policy 1.

Specifically, if the user plane encryption protection policy is required, for all the DRBs corresponding to the E-RAB, the target eNB determines that encryption activation statuses corresponding to all the DRBs are activated. If the user plane encryption protection policy corresponding to the E-RAB is preferred, for all the DRBs corresponding to the E-RAB, the target eNB determines that encryption activation statuses corresponding to the DRBs can be activated or cannot be activated. The target eNB may determine, according to a local policy (for example, a running status of the target eNB, a control policy, or regulations required), whether to activate the encryption activation status. If the user plane encryption protection policy corresponding to the E-RAB is not needed, for all the DRBs corresponding to the E-RAB, the target eNB determines that encryption activation statuses corresponding to all the DRBs are not activated.

If the user plane integrity protection policy is required, for all the DRBs corresponding to the E-RAB, the target eNB determines that integrity encryption activation statuses corresponding to all the DRBs are activated. If the user plane integrity protection policy corresponding to the E-RAB is preferred, for all the DRBs corresponding to the E-RAB, the target eNB determines that integrity encryption activation statuses corresponding to the DRBs can be activated or cannot be activated. The target eNB may determine, according to a local policy (for example, a running status of the target eNB, a control policy, or regulations required), whether to activate the integrity protection activation status. If the user plane integrity protection policy corresponding to the E-RAB is not needed, for all the DRBs corresponding to the E-RAB, the target eNB determines that integrity encryption activation statuses corresponding to all the DRBs are not activated.

S409: The target eNB sends a handover request acknowledge (handover request acknowledge) message to the target MME.

The handover request acknowledge message includes a radio resource control (radio resource control, RRC) reconfiguration (connection reconfiguration), and the RRC reconfiguration is constructed by the target eNB.

The RRC reconfiguration carries configuration information, and the configuration information indicates whether the UE activates user plane encryption protection and/or user plane integrity protection in the 4G network. The configuration information is determined based on the user plane security activation status in S408.

Specifically, if determining that the encryption activation status is activated, the target eNB encapsulates a ciphering disabled (ciphering disabled) field in the configuration information. If determining that the encryption activation status is not activated, the target eNB does not encapsulate a ciphering disabled (ciphering disabled) field in the configuration information. If determining that the integrity protection activation status is activated, the target eNB encapsulates an integrity protection (integrity protection) field in the configuration information. If determining that the integrity protection activation status is not activated, the target eNB does not encapsulate an integrity protection (integrity protection) field in the configuration information.

The integrity protection field indicates to activate user plane integrity protection. The integrity protection field may be equivalent to indication information for activating user plane integrity protection, or content of the integrity protection field may be indication information for activating user plane integrity protection. Therefore, when the integrity protection field is encapsulated in the configuration information, it may be considered that the RRC reconfiguration includes the indication information for activating user plane integrity protection.

S410: The target MME sends a forward relocation response (forward relocation response) message to the source AMF. The forward relocation response message includes the RRC reconfiguration, and the RRC reconfiguration includes the configuration information.

S411: The source AMF sends a handover command (handover command) message to the source gNB. The handover command message includes the RRC reconfiguration, and the RRC reconfiguration includes the configuration information.

S412: The source gNB sends the RRC reconfiguration to the UE. The UE determines, based on the configuration information included in the RRC reconfiguration, whether to activate user plane security encryption protection and/or user plane integrity protection between the UE and the target eNB.

Specifically, if the ciphering disabled (ciphering disabled) field is encapsulated in the configuration information, the UE does not activate the encryption protection in the 4G network. If the ciphering disabled (ciphering disabled) field is not encapsulated in the configuration information, the UE activates the encryption protection in the 4G network. If the integrity protection (integrity protection) field is encapsulated in the configuration information, the UE activates the integrity protection in the 4G network. If the integrity protection (integrity protection) field is not encapsulated in the configuration information, the UE does not activate the integrity protection in the 4G network.

S413: The UE sends an RRC reconfiguration complete message to the target eNB to complete the handover.

Figure 5:
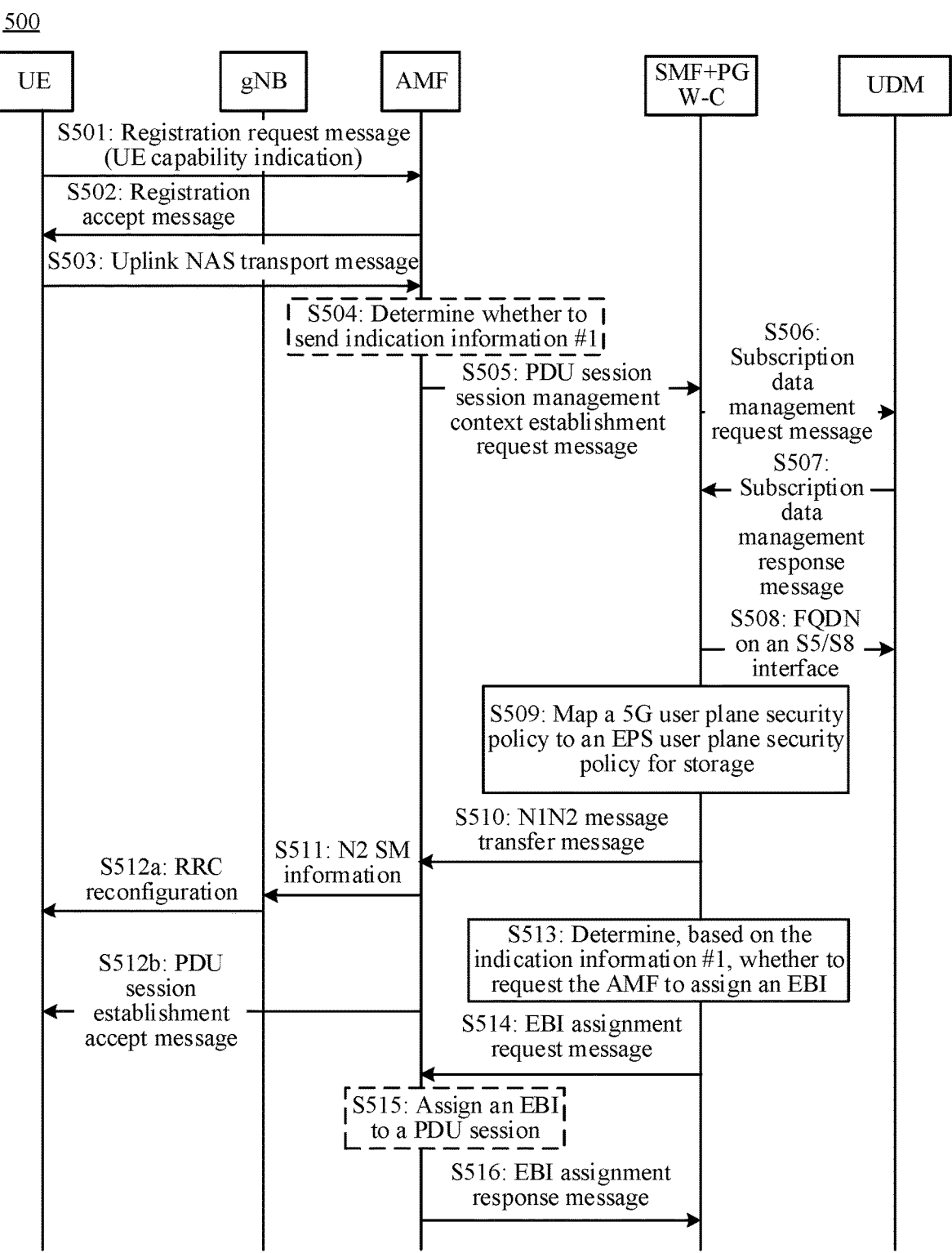
FIG. 5 is a schematic flowchart of a communication method according to another embodiment of this application.

FIG. 5 is a schematic flowchart of a method according to an embodiment of this application. Specifically, FIG. 5 shows a process in which an SMF+PGW-C maps a user plane security policy of UE in a 5G network to a user plane security policy of the UE in a 4G network before the UE is handed over from the 5G network to the 4G network, and FIG. 5 further shows a procedure in which the SMF+PGW-C requests, based on indication information #1, to assign an EBI and send an FQDN on an S5/S8 interface. As shown in FIG. 5, the method 500 includes S501 to S516. The following describes steps in detail.

S501: The UE sends a registration request (registration request) message to an AMF.

The registration request message includes a UE capability indication. The UE capability indication is equivalent to the second indication information in the embodiment in FIG. 2. For related descriptions, refer to related content in the embodiment in FIG. 2. Details are not described herein again. The UE capability indication may be carried in a 5G MM capability, a UE security capability, or an S1 UE network capability.

S502: The AMF sends a registration accept (registration accept) message to the UE.

Optionally, the AMF stores the UE capability indication in a context of the UE.

S503: The UE sends an uplink NAS transport (uplink NAS transport) message to the AMF.

The uplink NAS transport message includes SM container information, and the SM container information includes a PDU session establishment request message. The uplink NAS transport message further includes a DNN and S-NS-SAI.

Optionally, the method 500 may further include S504: The AMF determines whether to send the indication information #1.

The indication information #1 is equivalent to the first indication information in the embodiment in FIG. 2. For related descriptions, refer to related content in the embodiment in FIG. 2. Details are not described herein again.

The AMF obtains the context of the UE based on the uplink NAS transport message. Further, the AMF determines, based on the uplink NAS transport message and the context of the UE, whether to send the indication information #1. In a possible implementation, the AMF determines, based on an indication indicating that the DNN and the S-NSSAI support interworking with an EPS and the UE capability indication that are stored in the context of the UE, whether to send the indication information #1. If the indication that the DNN and the S-NSSAI support the interworking with the EPS indicates that the UE supports interworking with the EPS, and the UE capability indication indicates that the UE supports user plane integrity protection with an eNB, the AMF determines to send the indication information #1.

A process in which the AMF determines, based on the uplink NAS transport message and the context of the UE, whether to send the indication information #1 is equivalent to that the access and mobility management function network element determines, according to a local policy #1, whether to send the first indication information in the embodiment in FIG. 2. That is, the local policy #1 of the access and mobility management function network element may include: whether the DNN and the S-NSSAI support the interworking with the EPS, and whether the UE capability indication is obtained. Whether the DNN+S-NSSAI supports the interworking with the EPS may also be understood as whether a PDU session corresponding to the DNN+S-NSSAI supports the interworking with the EPS.

The indication of supporting the interworking with the EPS indicates whether the UE supports the interworking with the EPS, and the indication of supporting the interworking with the EPS is stored in subscription information of the UE. When the UE registers with the network, the AMF obtains, from a UDM, the indication that is stored in the subscription information of the UE and that is of supporting the interworking with the EPS, and stores, in the context of the UE, the indication of supporting the interworking with the EPS.

S505: The AMF sends a PDU session SM context establishment request (Nsmf_PDUSession_CreateSMContext Request) message to the SMF+PGW-C. The PDU session SM context establishment request message includes a subscription permanent identifier (subscription permanent identifier, SUPI), a DNN, S-NSSAI, and the indication information #1 of the UE.

The AMF obtains the context of the UE based on the uplink NAS transport message. Further, the AMF selects the SMF+PGW-C based on the uplink NAS transport message and the context of the UE. Optionally, the AMF selects the SMF+PGW-C based on the DNN and the S-NSSAI that are in the uplink NAS transport message and an indication that is stored in the context of the UE and that indicates that the UE supports an evolved packet core (evolved packet core, EPC) NAS. Optionally, the AMF further selects the SMF+PGW-C based on the indication that is stored in the context of the UE and that indicates that the DNN and the S-NSSAI support the interworking with the EPS. The indication indicating that the UE supports the EPC NAS indicates whether the UE supports an S1 mode (a mode in which an access network device interacts with a core network device through an S1 interface). When the UE registers with the network, the UE reports, based on a 5G mobility management capability (5G MM capability), the indication indicating that the UE supports the EPC NAS.

S506: The SMF+PGW-C sends a subscription data management request (Nudm_SubscriberDataManagement_Get) message to the UDM, to request the subscription information of the UE. The obtained subscription data management request message includes: an SUPI, a DNN, and S-NSSAI.

S507: The UDM sends a subscription data management response (Nudm_SubscriberDataManagement_Response) message to the SMF+PGW-C.

The subscription data management response message includes session management subscription data of the UE. The session management subscription data of the UE includes the DNN, the S-NSSAI, the user plane security policy of the UE in the 5G network, and the indication of supporting the interworking with the EPS. The user plane security policy of the UE in the 5G network and the indication of supporting the interworking with the EPS are at a granularity of the DNN, the S-NSSAI, or the DNN+S-NSSAI. For example, the user plane security policy of the UE in the 5G network and the indication of supporting the interworking with the EPS are at the granularity of the DNN+S-NSSAI. The session management subscription data of the UE may be represented as: {S-NSSAI 1, DNN 1, user plane security policy 1, indication 1 of supporting interworking with the EPS}. {S-NSSAI 1, DNN 1, user plane security policy 1, indication 1 of supporting interworking with the EPS} indicates that the user plane security policy 1 and the indication 1 of supporting the interworking with the EPS correspond to the S-NSSAI 1+DNN 1, in other words, the user plane security policy 1 and the indication 1 of supporting the interworking with the EPS are at a granularity of the S-NSSAI 1+DNN 1.

If the user plane security policy that is of the UE in the 5G network and that is included in the session management subscription data of the UE is at the granularity of the DNN+S-NSSAI, the SMF+PGW-C may map the user plane security policy of the UE in the 5G network at the granularity of the DNN+S-NSSAI to a user plane security policy at a granularity of the PDU session. One DNN+S-NSSAI may correspond to one or more PDU sessions. For example, the SMF+PGW-C obtains a PDU session 1 through mapping from the DNN 1+S-NSSAI 1, and then determines, according to the user plane security policy 1 corresponding to the DNN 1+S-NSSAI 1, a user plane security policy 1 corresponding to the PDU session 1.

S508: The SMF+PGW-C sends the FQDN of the SMF+PGW-C on the S5/S8 interface to the UDM.

Specifically, the SMF+PGW-C sends the FQDN of the SMF+PGW-C on the S5/S8 interface to the UDM based on the indication information #1. For more descriptions of how the SMF+PGW-C sends the FQDN of the SMF+PGW-C on the S5/S8 interface based on the indication information #1, refer to the foregoing descriptions in S240. For brevity, details are not described herein again.

Optionally, the SMF+PGW-C may add the FQDN of the SMF+PGW-C on the S5/S8 interface to the subscription data management request message, and send the FQDN to the UDM. In this case, S508 and S506 may be combined into one step.

S509: The SMF+PGW-C maps a 5G context to an EPS bearer context.

That the SMF+PGW-C map a 5G context to an EPS bearer context includes mapping a QoS parameter to an EPS QoS parameter, and further includes mapping a 5G user plane security policy to an EPS user plane security policy.

Optionally, the SWIF+PGW-C maps the 5G user plane security policy to the EPS user plane security policy based on the indication information #1. The SMF+PGW-C stores the mapped EPS user plane security policy in the EPS context of the UE. In other words, when receiving the indication information #1, the SWIF+PGW-C maps the 5G context to the EPS bearer context.

Specifically, for descriptions of how the SMF+PGW-C maps a user plane security policy to an EPS user plane security policy, refer to the foregoing descriptions in S310. For brevity, details are not described herein again.

S510: The SMF+PGW-C sends an N1N2 message transfer (Namf_Communication_N1N2MessageTransfer) message to the AMF.

The N1N2 message transfer message includes N1 SM information and N2 SM information. The AMF does not parse the N1 SM information, and transparently transfers the N1 SM information to the UE. The N1 SM information includes a PDU session establishment accept (PDU Session Establishment Accept) message. The AMF does not parse the N2 SM information, and transparently transfers the N2 SM information to a gNB. The N2 SM information includes the user plane security policy at the granularity of the PDU session.

S511: The AMF sends the N2 SM information to the gNB, and the gNB determines a user plane security activation status at a granularity of a DRB according to the user plane security policy at the granularity of the PDU session.

S512a: The gNB sends an RRC reconfiguration to the UE, where the RRC reconfiguration includes configuration information. The UE determines, based on the configuration information included in the RRC reconfiguration, whether to activate user plane security encryption protection/user plane integrity protection between the UE and the gNB.

S512b: The AMF sends, to the UE, content of the N1 SM information, namely, the PDU session establishment accept message, to complete PDU session establishment.

S513: The SMF+PGW-C determines, according to a local policy #3, whether to request the AMF to assign an EBI.

The local policy #3 includes, for example, that the current PDU session is used for a 3rd generation partnership project (3rd generation partnership project, 3GPP) access and supports interworking with the EPS through an N26 interface.

Further, the SMF+PGW-C further performs further determining based on the indication information #1 and an integrity protection policy in the user plane security policy of the UE in the 5G network. For example, if obtaining the indication information #1, the SWIF+PGW-C does not need to determine the user plane security policy of the UE in the 5G network. If the SMF+PGW-C does not obtain the indication information #1 of the UE, the integrity protection policy in the user plane security policy of the UE in the 5G network is not required. In this case, the SMF+PGW-C needs to request the AMF to assign the EBI. If the integrity protection policy in the user plane security policy of the UE in the 5G network is required, the SMF+PGW-C cannot request the AMF to assign the EBI.

For how to determine whether the SMF+PGW-C requests the AMF to assign the EBI to the PDU session, refer to the related descriptions in S220 in the embodiment in FIG. 2. Details are not described herein again.

S514: If the SMF+PGW-C determines to request the AMF to assign the EBI, the SMF+PGW-C sends an EBI assignment request message to the AMF. The EBI assignment request message includes a PDU session ID.

S515: The AMF assigns an EBI to the PDU session.

S516: The AMF sends an EBI assignment response message to the SMF+PGW-C. The EBI assignment response message includes the assigned EBI. The SWIF+PGW-C associates the EBI with the mapped EPS context.

It should be understood that in the method 500, sequence numbers of the foregoing processes do not mean execution sequences. The execution sequences of the processes should be determined based on functions and internal logic of the processes, and should not be construed as any limitation on the implementation processes of the method 500. For example, S508 may be performed between S505 and S512 (S512a/S512b), or S508 may be performed after S516. To be specific, after the SMF+PGW-C successfully receives the EBI assignment response message, and it indicates that the SMF+PGW-C determines that the AMF successfully assigns the EBI, the SMF+PGW-C performs S508. For another example, the content of the N1 SM information in S511b may be carried in the RRC reconfiguration message in S511a. Therefore, S511a and S511b may be performed simultaneously. For another example, S509 may be performed between S505 and S516, or S509 may be performed after S516.

In this embodiment of this application, before the UE is handed over from the 5G network to the 4G network, the SWIF+PGW-C maps the user plane security policy of the UE in the 5G network to the user plane security policy of the UE in the 4G network, so that in a process of subsequently handing over the UE from the 5G network to the 4G network, the AMF in the 5G network may directly obtain the user plane security policy of the UE in the 4G network from the SMF+PGW-C, and there is no need to wait for the SWIF+PGW-C to map the user plane security policy of the UE in the 5G network to the user plane security policy of the UE in the 4G network, thereby reducing a handover delay.

Figure 6:
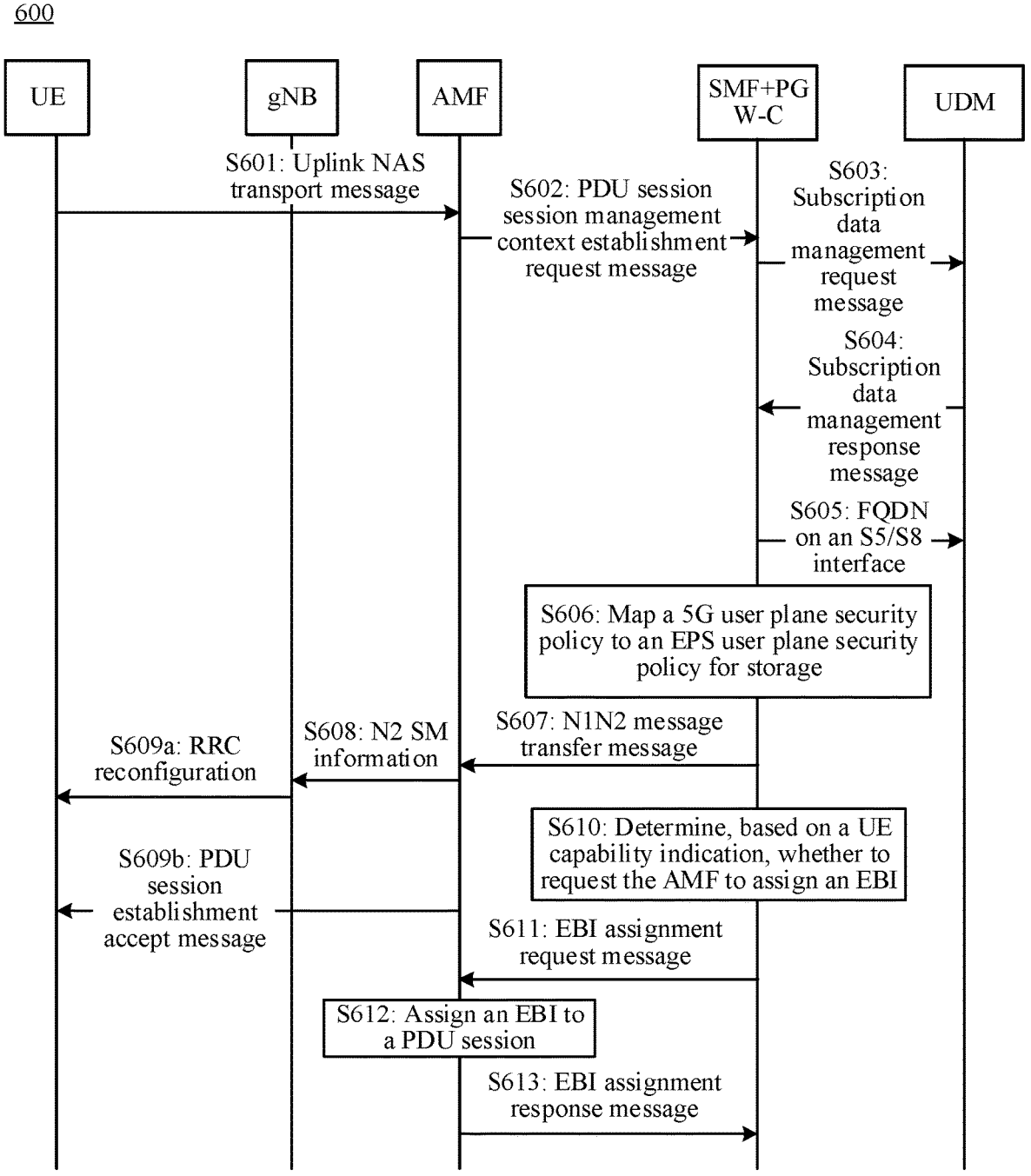
FIG. 6 is a schematic flowchart of a communication method according to another embodiment of this application.

FIG. 6 is a schematic flowchart of a method according to an embodiment of this application. Specifically, FIG. 6 shows a process in which an SMF+PGW-C maps a user plane security policy of UE in a 5G network to a user plane security policy of the UE in a 4G network before the UE is handed over from the 5G network to the 4G network, and FIG. 6 further shows a procedure in which the SMF+PGW-C requests, based on UE capability indication, to assign an EBI and send an FQDN on an S5/S8 interface. As shown in FIG. 6, the method 600 includes S601 to S613. The following describes steps in detail.

S601: The UE sends an uplink NAS transport message to an AMF.

The uplink NAS transport message includes SM container information, and the SM container information includes a PDU session establishment request message. The uplink NAS transport message further includes a DNN and S-NS-SAI.

The PDU session establishment request message includes a UE capability indication. The UE capability indication is equivalent to the first indication information in S211b and S212b in the embodiment in FIG. 2. For related descriptions, refer to related content in the embodiment in FIG. 2. Details are not described herein again.

S602: The AMF sends a PDU session establishment SM context request message to the SMF+PGW-C. The PDU session establishment SM context request message includes an SUPI, a DNN, S-NSSAI, and the PDU session establishment request message of the UE.

S603 to S613 are the same as S506 to S516 in the method 500. For brevity, details are not described herein again.

It should be understood that in the method 600, sequence numbers of the foregoing processes do not mean execution sequences. The execution sequences of the processes should be determined based on functions and internal logic of the processes, and should not be construed as any limitation on the implementation processes of the method 600. For example, S606 may be performed between S604 and S609 (S609a/S609b), or S606 may be performed after S613. To be specific, after the SMF+PGW-C successfully receives an EBI assignment response message, and it indicates that the SMF+PGW-C determines that the AMF successfully assigns the EBI, the SMF+PGW-C performs S606. For another example, the content of the N1 SM information in S609b may be carried in the RRC reconfiguration message in S609a. Therefore, S609a and S609b may be performed simultaneously. For another example, S605 may be performed between S602 and S613, or S605 may be performed after S613.

In this embodiment of this application, before the UE is handed over from the 5G network to the 4G network, the SWIF+PGW-C maps the user plane security policy of the UE in the 5G network to the user plane security policy of the UE in the 4G network, so that in a process of subsequently handing over the UE from the 5G network to the 4G network, the AMF in the 5G network may directly obtain the user plane security policy of the UE in the 4G network from the SMF+PGW-C, and there is no need to wait for the SMF+PGW-C to map the user plane security policy of the UE in the 5G network to the user plane security policy of the UE in the 4G network, thereby reducing a handover delay.

Figure 7A:
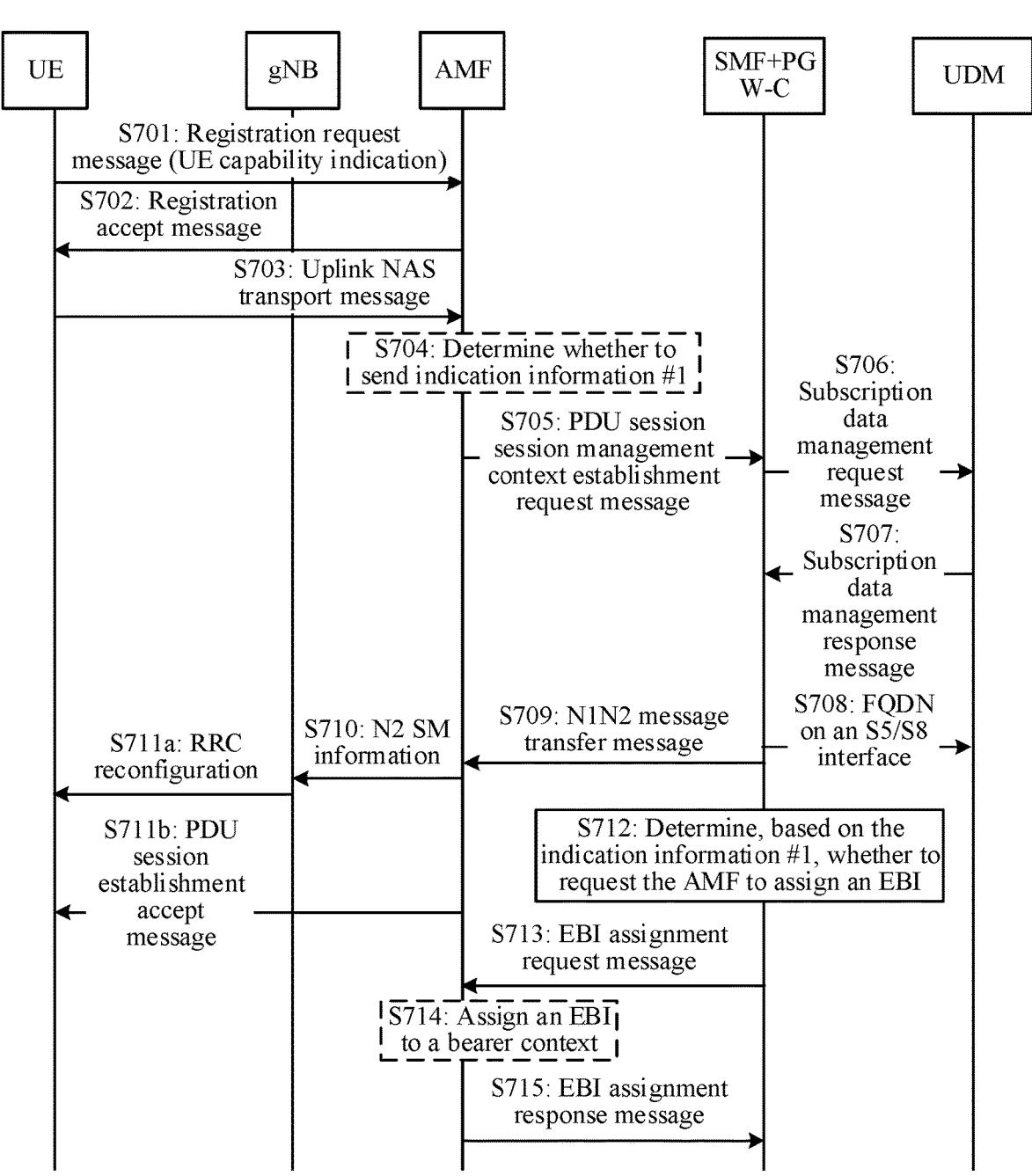
FIG. 7(a) and FIG. 7(b) are a schematic flowchart of a communication method according to another embodiment of this application.
Figure 7B:
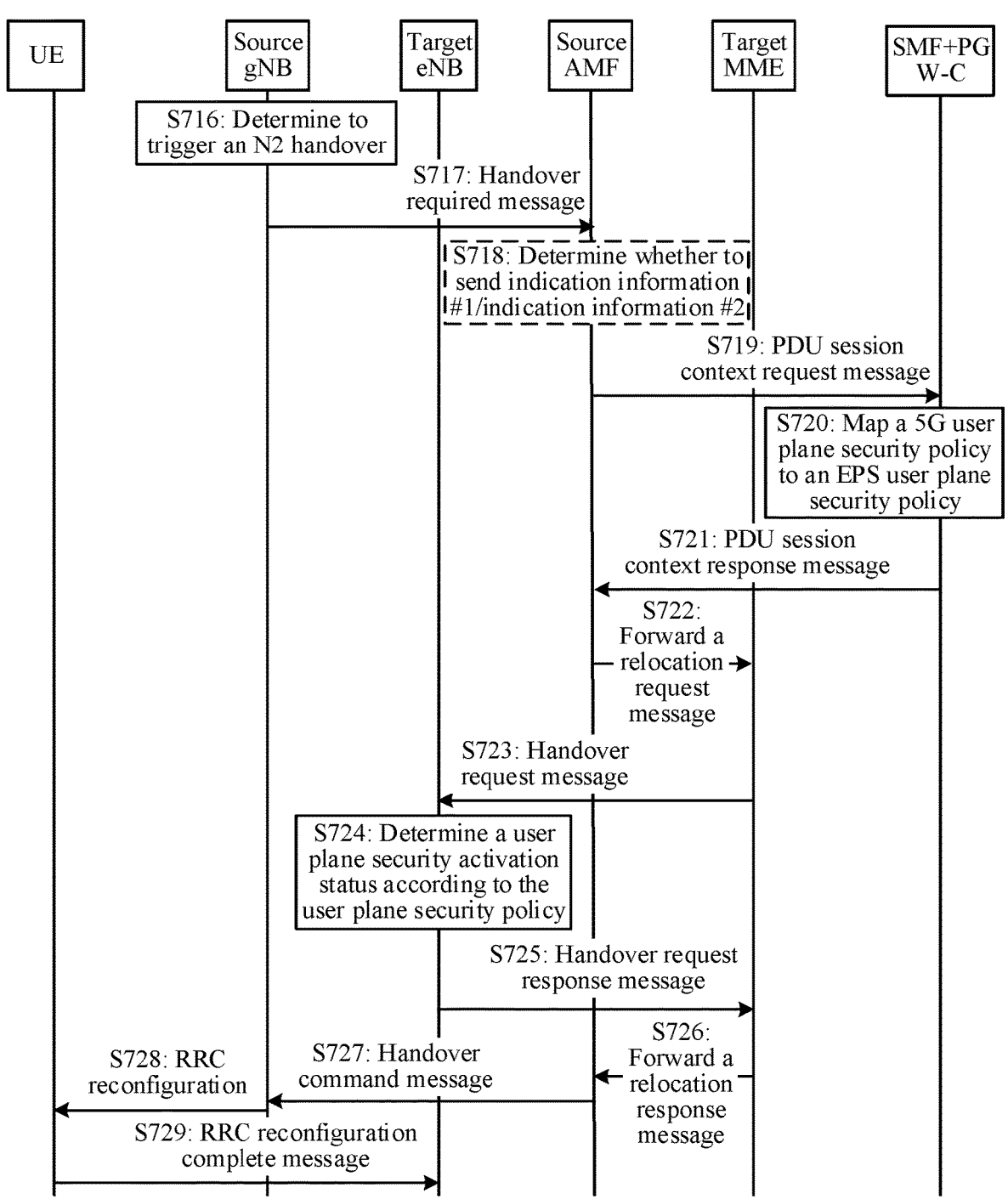

FIG. 7(a) and FIG. 7(b) is a schematic flowchart of a method according to an embodiment of this application. Specifically, FIG. 7(a) shows a process in which an SMF+PGW-C requests, based on indication information #2, to assign an EBI and send an FQDN on an S5/S8 interface before UE is handed over from a 5G network to a 4G network. FIG. 7(b) shows a process in which the SMF+PGW-C maps a user plane security policy of the UE in the 5G network to a user plane security policy of the UE in the 4G network in a process of handing over the UE from the 5G network to the 4G network. As shown in FIG. 7(a) and FIG. 7(b), the method 700 includes S701 to S728. The following describes steps in detail.

S701 to S708 are the same as S501 to S508 in the method 500, and S709 to S715 are the same as S510 to S516 in the method 500. For brevity, details are not described herein again.

Optionally, in S705, the SMF+PGW-C stores indication information #1 in a context of a terminal device.

S716 to S717 are the same as S401 to S402 in the method 400. For brevity, details are not described herein again.

S718: A source AMF determines whether to send the indication information #1/the indication information #2.

The indication information #1 is equivalent to the first indication information in the embodiment in FIG. 2. For related descriptions, refer to related content in the embodiment in FIG. 2. Details are not described herein again.

The indication information #2 indicates to perform user plane security policy mapping. Alternatively, the indication information #2 indicates that user plane integrity protection with an access network device in the 4G network is supported. Alternatively, the indication information #2 indicates that on-demand user plane protection with an access network device in the 4G network is supported. Alternatively, the indication information #2 indicates that interworking of the user plane security policy between the 5G network and the 4G network is supported, in other words, indicates that mapping of the user plane security policy between the 5G network and the 4G network is supported.

The source AMF obtains a context of the UE based on an uplink NAS transport message. Further, the source AMF determines, based on the uplink NAS transport message, the context of the UE, and whether a target MME supports user plane integrity protection, whether to send the indication information #1/the indication information #2. The source AMF further stores capability information of the target MME, and the capability information of the target MME indicates whether the target MME supports user plane integrity protection. If the target MME supports user plane integrity protection, the source AMF determines to send the UE indication capacity #1/the indication information #2. The capability information of the target MME is locally configured by the AMF.

A process in which the AMF determines, based on the uplink NAS transport message and the context of the UE, whether to send the indication information #1 is equivalent to that the access and mobility management function network element determines, according to a local policy #1, whether to send the first indication information in the embodiment in FIG. 2. That is, the local policy #1 of the access and mobility management function network element may further include whether the target MME supports user plane integrity protection. The source AMF determines, according to a local policy #4 (an example of a second local policy), whether to send the indication information #2. The local policy #4 may include: whether a DNN and S-NSSAI support interworking with an EPS, whether a UE capability indication is obtained, and whether the target MME supports user plane integrity protection. For a manner in which the source AMF determines whether the DNN and the S-NSSAI support interworking with an EPS and whether the target MME supports user plane integrity protection, refer to the descriptions of the local policy #1 in the embodiment in FIG. 5 and the embodiment in FIG. 7(a) and FIG. 7(b).

S719: The source AMF sends a PDU session context request (Nsmf_PDUSession_Context Request) message to the SMF+PGW-C.

Before sending the PDU session context request message to the SMF+PGW-C, the source AMF determines, according to a local policy #2, whether to obtain an EPS bearer context from the SMF+PGW-C. If the source AMF determines, according to the local policy #2, to obtain the EPS bearer context from the SMF+PGW-C, the source AMF sends the PDU session context request message to the SMF+PGW-C. The PDU session context request message includes a PDU session ID.

Optionally, the PDU session context request message further includes the indication information #2.

The local policy #2 of the source AMF may include: The source AMF has assigned an EBI to a PDU session to be handed over. Specifically, the source AMF obtains the context of the UE based on the identifier of the UE. Further, the source AMF obtains, based on the context of the UE, a PDU session that needs to be handed over, and determines whether the EBI has assigned to the PDU session.

It should be noted that, with reference to the embodiments in FIG. 2 and FIG. 7(*a*) and FIG. 7(*b*), between S703 and S711*b* (in other words, in a process of PDU session establishment in the 5G network for the UE), when the SMF+PGW-C determines that the PDU session supports a handover to the EPS, S713 to S715 in the method 700 are performed to request the AMF to assign the EBI to the PDU session. After assigning the EBI to the PDU session, the AMF may store the assigned EBI in the context of the UE.

S720: The SMF+PGW-C maps a 5G user plane security policy to an EPS user plane security policy.

Optionally, the SMF+PGW-C obtains context information of the UE based on the PDU session context request message, and obtains the indication information #1 from the context information of the UE. The SMF+PGW-C maps the 5G user plane security policy to the EPS user plane security policy based on the indication information #1.

Optionally, the SMF+PGW-C maps the 5G user plane security policy to the EPS user plane security policy based on the indication information #2 obtained from the PDU session context request message.

Specifically, for more descriptions of mapping, by the SMF+PGW-C, a 5G user plane security policy to an EPS user plane security policy, refer to the foregoing descriptions in S310.

S721 to S729 are the same as S405 to S413 in the method 400. For brevity, details are not described herein again.

In this embodiment of this application, in the process in which the UE is handed over from the 5G network to the 4G network, the SMF+PGW-C maps the user plane security policy of the UE in the 5G network to the user plane security policy of the UE in the 4G network, to avoid unnecessary mapping. For example, before the UE is handed over from the 5G network to the 4G network, after the SMF+PGW-C maps the user plane security policy of the UE in the 5G network to the user plane security policy of the UE in the 4G network, if the UE does not access the 4G network, the UE does not perform a handover procedure. In this case, if the SMF+PGW-C performs unnecessary mapping, computing resources and storage resources of the SMF+PGW-C are wasted.

The methods provided in embodiments of this application are described above in detail with reference to FIG. 2 to FIG. 7(*a*) and FIG. 7(*b*). Communication apparatuses provided in embodiments of this application are described below in detail with reference to FIG. 8 and FIG. 9. It should be understood that descriptions of apparatus embodiments correspond to the descriptions of the method embodiments. Therefore, for content that is not described in detail, refer to the foregoing method embodiments. For brevity, details are not described herein again.

In embodiments of this application, a transmit end device or a receive end device may be divided into functional modules based on the foregoing method examples. For example, each functional module may be obtained through division corresponding to each function, or two or more functions may be integrated in one processing module. The integrated module may be implemented in a form of hardware, or may be implemented in a form of a software functional module. It should be noted that, in embodiments of this application, module division is an example, and is merely a logical function division. During actual implementation, another division manner may be used. An example in which each functional module is obtained through division based on each corresponding function is used below for description.

Figure 8:
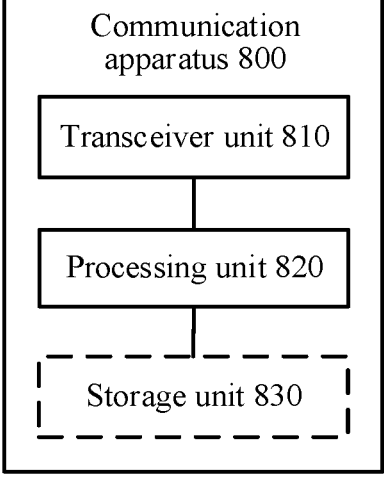
FIG. 8 is a schematic block diagram of a communication apparatus according to an embodiment of this application.

FIG. 8 is a schematic block diagram of a communication apparatus 800 according to an embodiment of this application. As shown in the figure, the communication apparatus 800 may include: a transceiver unit 810 and a processing unit 820.

In a possible design, the apparatus 800 may be the session management network element in the foregoing method embodiments, or may be a chip configured to implement a function of the session management network element in the foregoing method embodiments.

It should be understood that the communication apparatus 800 may correspond to the session management network element in the method 200 to the method 700 according to embodiments of this application. The communication apparatus 800 may include units configured to perform the methods performed by the session management network element in the method 200 in FIG. 2, the method 300 in FIG. 3, the method 200 in FIG. 4, the method 500 in FIG. 5, the method 600 in FIG. 6, and the method 700 in FIG. 7(*a*) and FIG. 7(*b*). In addition, the units in the communication apparatus 800 and the foregoing other operations and/or functions are respectively intended to implement corresponding procedures of the method 200 in FIG. 2, the method 300 in FIG. 3, the method 200 in FIG. 4, the method 500 in FIG. 5, the method 600 in FIG. 6, and the method 700 in FIG. 7(*a*) and FIG. 7(*b*). It should be understood that a specific process in which the units perform the foregoing corresponding steps is described in detail in the foregoing method embodiments. For brevity, details are not described herein.

In another possible design, the communication apparatus 800 may be the access and mobility management function network element in the foregoing method embodiments, or may be a chip configured to implement a function of the access and mobility management function network element in the foregoing method embodiments.

It should be understood that the communication apparatus 800 may correspond to the access and mobility management function network element in the method 200 to the method 700 according to embodiments of this application. The communication apparatus 800 may include units configured to perform the methods performed by the access and mobility management function network element in the method 200 in FIG. 2, the method 300 in FIG. 3, the method 200 in FIG. 4, the method 500 in FIG. 5, the method 600 in FIG. 6, and the method 700 in FIG. 7(*a*) and FIG. 7(*b*). In addition, the units in the communication apparatus 800 and the foregoing other operations and/or functions are respectively intended to implement corresponding procedures of the method 200 in FIG. 2, the method 300 in FIG. 3, the method 200 in FIG. 4, the method 500 in FIG. 5, the method 600 in FIG. 6, and the method 700 in FIG. 7(*a*) and FIG. 7(*b*). It should be understood that a specific process in which the units perform the foregoing corresponding steps is described in detail in the foregoing method embodiments. For brevity, details are not described herein.

In a possible design, the apparatus 800 may be the terminal device in the foregoing method embodiments, or may be a chip configured to implement a function of the terminal device in the foregoing method embodiments.

It should be understood that the communication apparatus 800 may correspond to the terminal device in the method 200 to the method 700 according to embodiments of this application. The communication apparatus 800 may include units configured to perform the methods performed by the terminal device in the method 200 in FIG. 2, the method 300 in FIG. 3, the method 200 in FIG. 4, the method 500 in FIG. 5, the method 600 in FIG. 6, and the method 700 in FIG. 7(*a*) and FIG. 7(*b*). In addition, the units in the communication apparatus 800 and the foregoing other operations and/or functions are respectively intended to implement corresponding procedures of the method 200 in FIG. 2, the method 300 in FIG. 3, the method 200 in FIG. 4, the method 500 in FIG. 5, the method 600 in FIG. 6, and the method 700 in FIG. 7(*a*) and FIG. 7(*b*). It should be understood that a specific process in which the units perform the foregoing corresponding steps is described in detail in the foregoing method embodiments. For brevity, details are not described herein.

Figure 9:
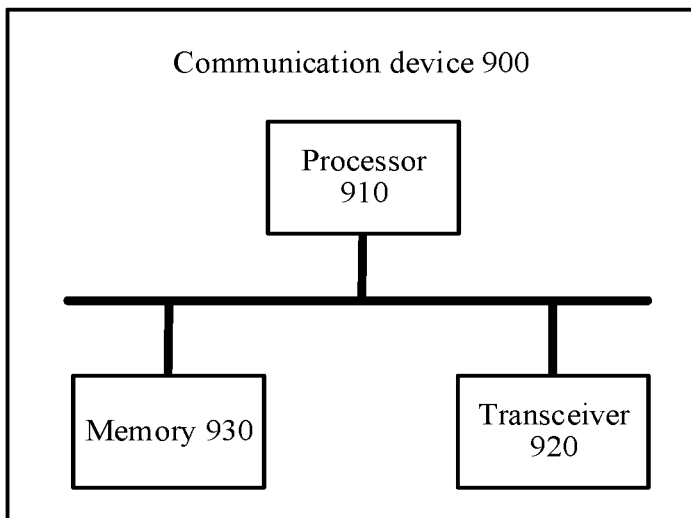
FIG. 9 is a schematic block diagram of a communication device according to an embodiment of this application.

It should be further understood that the transceiver unit 810 in the communication apparatus 800 may correspond to a transceiver 920 in a communication device 900 shown in FIG. 9, and the processing unit 820 in the communication apparatus 800 may correspond to a processor 910 in the communication device 900 shown in FIG. 9.

It should be further understood that when the communication apparatus 800 is a chip, the chip includes a transceiver unit and a processing unit. The transceiver unit may be an input/output circuit or a communication interface. The processing unit may be a processor, a microprocessor, or an integrated circuit integrated on the chip.

The transceiver unit 810 is configured to implement a signal receiving and sending operation of the communication apparatus 800, and the processing unit 820 is configured to implement a signal processing operation of the communication apparatus 800.

Optionally, the communication apparatus 800 further includes a storage unit 830, and the storage unit 830 is configured to store instructions.

FIG. 9 is a schematic block diagram of a communication device 900 according to an embodiment of this application. As shown in the figure, the communication device 900 includes: at least one processor 910 and a transceiver 920. The processor 910 is coupled to a memory, and is configured to execute instructions stored in the memory, to control the transceiver 920 to send a signal and/or receive a signal. Optionally, the communication device 900 further includes a memory 930, configured to store instructions.

It should be understood that the processor 910 and the memory 930 may be integrated into one processing apparatus, and the processor 910 is configured to execute program code stored in the memory 930 to implement the foregoing functions. During specific implementation, the memory 930 may alternatively be integrated into the processor 910, or may be independent of the processor 910.

It should be further understood that the transceiver 920 may include a receiver (or referred to as a receive machine) and a transmitter (or referred to as a transmit machine). The transceiver 920 may further include an antenna. There may be one or more antennas. The transceiver 920 may be a communication interface or an interface circuit.

When the communication device 900 is a chip, the chip includes: a transceiver unit and a processing unit. The transceiver unit may be an input/output circuit or a communication interface. The processing unit may be a processor, a microprocessor, or an integrated circuit integrated on the chip. An embodiment of this application further provides a processing apparatus, including a processor and an interface. The processor may be configured to perform the methods in the foregoing method embodiments.

It should be understood that the processing apparatus may be a chip. For example, the processing apparatus may be a field programmable gate array (field programmable gate array, FPGA), an application-specific integrated circuit (application-specific integrated circuit, ASIC), a system on chip (system on chip, SoC), a central processing unit (central processing unit, CPU), a network processor (network processor, NP), a digital signal processor (digital signal processor, DSP), a microcontroller unit (microcontroller unit, MCU), a programmable logic device (programmable logic device, PLD), or another integrated chip.

During implementation, steps in the foregoing methods can be implemented by using a hardware integrated logical circuit in the processor, or by using instructions in a form of software. The steps in the methods disclosed with reference to embodiments of this application may be directly performed and completed by using a hardware processor, or may be performed and completed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in embodiments of this application may be an integrated circuit chip, and has a signal processing capability. During implementation, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor, or the like. The steps in the methods disclosed with reference to embodiments of this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, and not limitation, many forms of RAMS may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is run on a computer, the computer is enabled to perform the method in any one of the embodiments shown in FIG. 2 to FIG. 7(*a*) and FIG. 7(*b*).

According to the methods provided in embodiments of this application, this application further provides a computer-readable medium. The computer-readable medium stores program code. When the program code is run on a computer, the computer is enabled to perform the method in any one of the embodiments shown in FIG. 2 to FIG. 7(*a*) and FIG. 7(*b*).

According to the methods provided in embodiments of this application, this application further provides a system, including the session management network element, the terminal device, and the access and mobility management function network element described above.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (digital video disc, DVD)), a semiconductor medium (for example, a solid-state disc (solid-state disc, SSD)), or the like.

The network side device and the terminal device in the foregoing apparatus embodiments correspond to the network side device or the terminal device in the method embodiments. A corresponding module or unit performs a corresponding step. For example, a communication unit (a transceiver) performs a receiving or sending step in the method embodiments, and a step other than the sending or receiving step may be performed by a processing unit (a processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may perform communication by using a local and/or remote process and based on, for example, a signal having one or more data packets (for example, data from two components interacting with another component in a local system, a distributed system, and/or across a network such as the internet interacting with other systems by using the signal).

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, unit division is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist independently physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps in the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
obtaining, by a session management network element, first indication information in a session establishment process of a session in a first network for a terminal device, wherein the first indication information indicates that user plane integrity protection in a second network is supported;
sending, by the session management network element, a first request message to an access and mobility management function network element in the first network based on the first indication information, wherein the first request message is used to request to assign a bearer identifier of the second network for the session; and
receiving, by the session management network element from the access and mobility management function network element, a first response message including the bearer identifier.

2. The method of claim 1, the method further comprising:
mapping, by the session management network element, a user plane security policy of the terminal device in the first network to a user plane security policy of the terminal device in the second network; and
storing, by the session management network element, the user plane security policy in the second network in a bearer context corresponding to the bearer identifier of the second network.

3. The method of claim 2, the method further comprising:
obtaining, by the session management network element, third indication information indicating to perform user plane security policy mapping;

wherein the mapping, by the session management network element, the user plane security policy of the terminal device in the first network to the user plane security policy of the terminal device in the second network security policy of the terminal device in the second network comprises:
mapping, by the session management network element, the user plane security policy of the terminal device in the first network to the user plane security policy of the terminal device in the second network based on the third indication information.

4. The method of claim 2, the method further comprising:
sending, by the session management network element, the bearer context to a target mobility management entity in the second network via the access and mobility management function network element, wherein the target mobility management entity is a network element that serves the terminal device when the session is handed over to the second network.

5. The method of claim 1, wherein the user plane security policy of the terminal device in the first network comprises activating user plane integrity protection.

6. The method of claim 1, wherein the obtaining, by the session management network element, the first indication information comprises:
receiving, by the session management network element, the first indication information from the access and mobility management function network element.

7. The method of claim 1, wherein the first network is a 5th generation communication system network, the second network is an evolved packet system network, and the bearer context is an evolved packet system bearer context.

8. A communication method, comprising:
receiving, by an access and mobility management function network element in a first network, a registration request message from a terminal device, wherein the registration request message comprises second indication information indicating that the terminal device supports user plane integrity protection in a second network;
in a session establishment process of a session in the first network for the terminal device, sending, by the access and mobility management function network element, first indication information to a session management network element based on the second indication information, wherein the first indication information indicates that user plane integrity protection in the second network is supported;
receiving, by the access and mobility management function network element, a first request message for requesting to assign a bearer identifier of the second network for the session; and
sending, by the access and mobility management function network element to the session management network element, a first response message including the bearer identifier.

9. The method of claim 8, the method further comprising:
sending, by the access and mobility management function network element, a second request message to the session management function network element;
receiving, by the access and mobility management function network element, a second response message from the session management network element, wherein the second response message comprises a bearer context, the bearer context corresponds to the bearer identifier and comprises a user plane security policy of the terminal device in the second network, and the user plane security policy in the second network is obtained according to a user plane security policy of the terminal device in the first network; and sending, by the access and mobility management function network element, the bearer context to a target mobility management entity in the second network, wherein the target mobility management entity is a network element that serves the terminal device when the session is handed over to the second network.

10. The method of claim 9, wherein a granularity of the user plane security policy in the first network is a granularity of a protocol data unit session; and a granularity of the user plane security policy in the second network is a granularity of an evolved packet system bearer.

11. The method of claim 8, wherein the first network is a 5th generation communication system network, the second network is an evolved packet system network, and the bearer context is an evolved packet system bearer context.

12. A communication apparatus, comprising:

at least one processor; and one or more memories coupled to the at least one processor and storing programming instructions that, when executed by the at least one processor, cause the communication apparatus to perform operations comprising:

obtaining first indication information in a session establishment process of a session in a first network for a terminal device, wherein the first indication information indicates that user plane integrity protection in a second network is supported;

sending a first request message to an access and mobility management function network element in the first network based on the first indication information, wherein the first request message is used to request to assign a bearer identifier of the second network for the session; and receiving a first response message from the access and mobility management function network element, wherein the first response message comprises the bearer identifier.

13. The apparatus of claim 12, wherein the operations further comprise:

mapping a user plane security policy of the terminal device in the first network to a user plane security policy of the terminal device in the second network; and storing the user plane security policy in the second network in a bearer context corresponding to the bearer identifier of the second network.

14. The apparatus of claim 13, wherein the operations further comprise:

obtaining third indication information, wherein the third indication information indicates to perform user plane security policy mapping;

wherein the mapping the user plane security policy of the terminal device in the first network to the user plane security policy of the terminal device in the second network comprises:

mapping the user plane security policy of the terminal device in the first network to the user plane security policy of the terminal device in the second network based on the third indication information.

15. The apparatus of claim 13, wherein the operations further comprise:

sending the bearer context to a target mobility management entity in the second network via the access and mobility management function network element, wherein the target mobility management entity is a network element that serves the terminal device when the session is handed over to the second network.

16. The apparatus of claim 12, wherein the user plane security policy of the terminal device in the first network comprises activating user plane integrity protection.

17. The apparatus of claim 12, wherein the obtaining the first indication information comprises:

receiving the first indication information from the access and mobility management function network element.

18. The apparatus of claim 12, wherein the first network is a 5th generation communication system network, the second network is an evolved packet system network, and the bearer context is an evolved packet system bearer context.

19. A communication apparatus, comprising:

at least one processor; and one or more memories coupled to the at least one processor and storing programming instructions that, when executed by the at least one processor, cause the communication apparatus to perform operations comprising:

receiving a registration request message sent by a terminal device through a first network, wherein the registration request message comprises second indication information indicating that the terminal device supports user plane integrity protection in a second network;

in a session establishment process of a session in the first network for the terminal device, sending first indication information to a session management network element based on the second indication information, wherein the first indication information indicates that user plane integrity protection in the second network is supported;

receiving a first request message for requesting to assign a bearer identifier of the second network for the session; and sending a first response message to the session management network element, wherein the first response message comprises the bearer identifier.

20. The apparatus of claim 19, wherein the operations further comprise:

sending a second request message to the session management function network element;

receiving a second response message from the session management network element, wherein the second response message comprises a bearer context, the bearer context corresponds to the bearer identifier of the second network and comprises a user plane security policy of the terminal device in the second network, and the user plane security policy in the second network is obtained according to a user plane security policy of the terminal device in the first network; and sending the bearer context to a target mobility management entity in the second network, wherein the target mobility management entity is a network element that serves the terminal device when the session is handed over to the second network.

21. The apparatus of claim 19, wherein the first network is a 5th generation communication system network, the second network is an evolved packet system network, and the bearer context is an evolved packet system bearer context.

* * * * *